(12) United States Patent
Yoshiuchi et al.

(10) Patent No.: US 11,521,150 B2
(45) Date of Patent: Dec. 6, 2022

(54) AUTONOMOUS CONTROL OF ANALYZING BUSINESS-RELATED DATA BY A ROBOT SYSTEM

(71) Applicant: Hitachi, Ltd., Tokyo (JP)

(72) Inventors: Hideya Yoshiuchi, Tokyo (JP); Tomohiro Matsuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 621 days.

(21) Appl. No.: 16/568,308

(22) Filed: Sep. 12, 2019

(65) Prior Publication Data
US 2020/0090103 A1 Mar. 19, 2020

(30) Foreign Application Priority Data
Sep. 19, 2018 (JP) .............................. JP2018-175470

(51) Int. Cl.
*G06Q 10/06* (2012.01)
*B25J 9/16* (2006.01)

(52) U.S. Cl.
CPC ........ *G06Q 10/06395* (2013.01); *B25J 9/162* (2013.01); *B25J 9/1669* (2013.01)

(58) Field of Classification Search
None
See application file for complete search history.

(56) References Cited

U.S. PATENT DOCUMENTS

2004/0243281 A1 12/2004 Fujita et al.
2014/0032281 A1* 1/2014 Shirado .................. G06Q 10/06
705/7.42
(Continued)

FOREIGN PATENT DOCUMENTS

EP 3279754 A1 * 2/2018 ............ B25J 13/003
JP 2013-158869 A 8/2013
(Continued)

OTHER PUBLICATIONS

Yoshiuchi, Hideya, Tomohiro Matsuda, and Jingze Dai. "Data analysis technology of service robot system for business improvement." Proceedings of the 2019 5th International Conference on Robotics and Artificial Intelligence. 2019. (Year: 2019).*
(Continued)

*Primary Examiner* — Brian M Epstein
*Assistant Examiner* — Derick J Holzmacher
(74) *Attorney, Agent, or Firm* — Mattingly & Malur, PC

(57) ABSTRACT

An objective of the present invention is to promote efficiency improvement of a business by a mobile device. A business analysis server that analyzes a business in a mobile device system conducting the business by controlling a mobile device on the basis of a scenario includes a control unit, and a storage unit including a business index value database that manages a business index value indicating an effect of the business and a business index value history database that manages a change in the business index value as time-series data. The control unit receives scenario execution information when a business index value is designated, analyzes a correlation between the business index value and the scenario by referring to the business index value history database and the scenario execution information, extracts a
(Continued)

target scenario whose correlation value with the business index value satisfies predetermined conditions, and generates a correction scenario.

10 Claims, 27 Drawing Sheets

(56) References Cited

U.S. PATENT DOCUMENTS

| | | | |
|---|---|---|---|
| 2014/0157156 A1* | 6/2014 | Kawamoto | G06F 3/04842 |
| | | | 715/764 |
| 2014/0200714 A1* | 7/2014 | Kawamoto | B25J 5/007 |
| | | | 901/1 |
| 2014/0207517 A1* | 7/2014 | Oshima | H04N 5/3532 |
| | | | 705/7.29 |
| 2016/0109954 A1* | 4/2016 | Harris | G06F 3/011 |
| | | | 345/156 |
| 2017/0185828 A1* | 6/2017 | Yamamoto | G06V 20/52 |
| 2017/0193309 A1* | 7/2017 | Kanda | H04N 5/2256 |
| 2018/0018520 A1* | 1/2018 | Sumiyoshi | G06V 20/10 |
| 2018/0099409 A1* | 4/2018 | Meier | B25J 9/1656 |
| 2018/0279004 A1* | 9/2018 | Takahashi | H04N 21/4668 |
| 2019/0012625 A1* | 1/2019 | Lawrenson | G07C 5/008 |

FOREIGN PATENT DOCUMENTS

| | | | | |
|---|---|---|---|---|
| WO | 2003/078113 A1 | 9/2003 | | |
| WO | WO-2015116543 A1 * | 8/2015 | | B25J 9/1602 |
| WO | WO-2019009385 A1 * | 1/2019 | | G05D 1/0088 |

OTHER PUBLICATIONS

Fujii, Tatsuya, Jae Hoon Lee, and Shingo Okamoto. "Gesture recognition system for human-robot interaction and its application to robotic service task." Proc. of the International Multi-Conference of Engineers and Computer Scientists (IMECS). vol. 1. 2014. (Year: 2014).*

Kamei, Koji, et al. "Recommendation from robots in a real-world retail shop." International conference on multimodal interfaces and the workshop on machine learning for multimodal interaction. 2010. (Year: 2010).*

* cited by examiner

FIG. 3

| ROBOT INFORMATION DB | | | | | | | |
|---|---|---|---|---|---|---|---|
| BASE IDENTIFIER | ROBOT IDENTIFIER | X COORDINATE | Y COORDINATE | STATES OF COMPONENTS CONFIGURING ROBOT | SCENARIO IDENTIFIER | EVENT IDENTIFIER | DATE AND TIME OF OCCURRENCE OF EVENT |

SERVICE DEVICE INFORMATION DB

| BASE IDENTIFIER | SERVICE DEVICE IDENTIFIER | EVENT IDENTIFIER | DATE AND TIME OF OCCURRENCE OF EVENT | SERVICE DEVICE POSITION INFORMATION |
|---|---|---|---|---|

FIG. 7

| SERVICE DEVICE INFORMATION DB | | | | | 463 |
|---|---|---|---|---|---|
| BASE IDENTIFIER | SERVICE DEVICE IDENTIFIER | EVENT IDENTIFIER | DATE AND TIME OF OCCURRENCE OF EVENT | SERVICE DEVICE POSITION INFORMATION | |

SCENARIO INFORMATION DB

| BASE IDENTIFIER | ROBOT IDENTIFIER | SCENARIO IDENTIFIER | STATE IDENTIFIER | BUSINESS IDENTIFIER | INPUT SOURCE IDENTIFIER | EXECUTION ACTION | EXECUTION DATE AND TIME OF ACTION | DURATION OF ACTION | TRANSITION DESTINATION STATE |

967

SCENARIO EXECUTION INFORMATION DB

| BASE IDENTIFIER | SCENARIO IDENTIFIER | ROBOT IDENTIFIER | EVENT IDENTIFIER | DATE AND TIME OF OCCURRENCE OF EVENT | EVENT SUCCESS/ FAILURE |

FIG. 11

| MEDIA PROCESSING INFORMATION DB | | | | | | 867 |
|---|---|---|---|---|---|---|
| BASE IDENTIFIER | ROBOT IDENTIFIER | SCENARIO IDENTIFIER | MEDIA TYPE | PROCESSING CONTENT | PROCESSING RESULT | PROCESSING ACCURACY |

FIG. 13

BASE INFORMATION DB — 362

| BASE IDENTIFIER | BASE MAP IDENTIFIER | X COORDINATE RANGE | Y COORDINATE RANGE | POSITION IDENTIFIER | BUSINESS IDENTIFIER | BUSINESS TYPE IDENTIFIER |

ROBOT INFORMATION DB — 363

| BASE IDENTIFIER | ROBOT IDENTIFIER | X COORDINATE | Y COORDINATE | STATES OF COMPONENTS CONFIGURING ROBOT | SCENARIO IDENTIFIER | EVENT IDENTIFIER | DATE AND TIME OF OCCURRENCE OF EVENT |

SCENARIO INFORMATION DB — 364

| BASE IDENTIFIER | ROBOT IDENTIFIER | SCENARIO IDENTIFIER | STATE IDENTIFIER | BUSINESS IDENTIFIER | INPUT SOURCE IDENTIFIER | EXECUTION ACTION | EXECUTION DATE AND TIME OF ACTION | DURATION OF ACTION | TRANSITION DESTINATION STATE |

SERVICE DEVICE INFORMATION DB — 365

| BASE IDENTIFIER | SERVICE DEVICE IDENTIFIER | ROBOT IDENTIFIER | EVENT IDENTIFIER | DATE AND TIME OF OCCURRENCE OF EVENT | SERVICE DEVICE POSITION INFORMATION |

SCENARIO EXECUTION INFORMATION DB — 367

| BASE IDENTIFIER | SCENARIO IDENTIFIER | ROBOT IDENTIFIER | EVENT IDENTIFIER | DATE AND TIME OF OCCURRENCE OF EVENT | EVENT SUCCESS/ FAILURE |

MEDIA PROCESSING INFORMATION DB — 369

| BASE IDENTIFIER | ROBOT IDENTIFIER | SCENARIO IDENTIFIER | MEDIA TYPE | PROCESSING CONTENT | PROCESSING RESULT | PROCESSING ACCURACY |

FIG. 15

BUSINESS IMPROVEMENT HISTORY DB — 563

| BASE IDENTIFIER | ROBOT IDENTIFIER | POSITION IDENTIFIER | BUSINESS IDENTIFIER | BUSINESS INDEX VALUE IDENTIFIER | SCENARIO IDENTIFIER | SCENARIO CORRECTION CONTENT | TRIAL PERIOD | ROOM FOR IMPROVEMENT OF BUSINESS INDEX VALUE | APPLICATION DATE AND TIME OF IMPROVEMENT |
|---|---|---|---|---|---|---|---|---|---|

BUSINESS INDEX VALUE DB — 565

| BASE IDENTIFIER | BUSINESS INDEX VALUE IDENTIFIER | SCENARIO CORRECTION TRIAL PERIOD | SCENARIO RELEVANCY THRESHOLD VALUE 1 | SCENARIO RELEVANCY THRESHOLD VALUE 2 | SCENARIO RELEVANCY THRESHOLD VALUE 3 |
|---|---|---|---|---|---|

BUSINESS INDEX VALUE HISTORY DB — 567

| BASE IDENTIFIER | BUSINESS INDEX VALUE IDENTIFIER | BUSINESS IDENTIFIER | OBSERVATION DATE AND TIME OF INDEX VALUE |
|---|---|---|---|

SCENARIO ATTRIBUTE INFORMATION DB — 569

| BASE IDENTIFIER | SCENARIO IDENTIFIER | BUSINESS INDEX VALUE IDENTIFIER | BUSINESS IDENTIFIER | OBSERVATION DATE AND TIME OF INDEX VALUE |
|---|---|---|---|---|

FIG. 26

ROBOT INFORMATION DB 267

| BASE IDENTIFIER | ROBOT IDENTIFIER | X COORDINATE | Y COORDINATE | STATES OF COMPONENTS CONFIGURING ROBOT | EXECUTION SCENARIO | DATE AND TIME OF OCCURRENCE OF EVENT | EVENT IDENTIFIER |
|---|---|---|---|---|---|---|---|

SCENARIO INFORMATION DB 268

| BASE IDENTIFIER | ROBOT IDENTIFIER | SCENARIO IDENTIFIER | STATE IDENTIFIER | BUSINESS IDENTIFIER | INPUT SOURCE IDENTIFIER | EXECUTION ACTION | EXECUTION DATE AND TIME OF ACTION | DURATION OF ACTION | TRANSITION DESTINATION STATE |
|---|---|---|---|---|---|---|---|---|---|

SCENARIO EXECUTION INFORMATION DB 269

| BASE IDENTIFIER | SCENARIO IDENTIFIER | ROBOT IDENTIFIER | EVENT IDENTIFIER | DATE AND TIME OF OCCURRENCE OF EVENT | EVENT SUCCESS/ FAILURE |
|---|---|---|---|---|---|

AUTONOMOUS CONTROL OF ANALYZING BUSINESS-RELATED DATA BY A ROBOT SYSTEM

INCORPORATION BY REFERENCE

This application claims priority based on Japanese patent application, No. 2018-175470 filed on Sep. 19, 2018, the entire contents of which are incorporated herein by reference.

BACKGROUND

The present invention relates to a business analysis server, a business analysis method, and a business analysis program.

IoT (Internet of Things) technology by which every device is connected to the Internet to provide various services has been spread. While the number of devices connected to the Internet has been rapidly increased, technology of a robot system that provides various services to humans using communications has been developed.

A robot is an example of a mobile device including a mobile function realized by a motor, an actuator, and the like, and can collect data with sensors mounted in the robot. In addition, functions can be extended in cooperation with a sensor and a camera outside the robot. An objective of introducing the robot and the robot system is to explore an improvement method of potential business efficiency by analyzing business-related data collected through the robot and the robot system, in addition to realizing a sufficient work force by substituting a human business. In order to improve the business efficiency, it is necessary to optimize actions of the robot by collecting various kinds of data through the robot system.

As a technique of optimizing actions of the robot, proposed is a control system in which a status of a robot is comprehensively determined on the basis of recognition results of the external environment by sight and hearing and an internal state of the robot and the next action is selected (for example, WO 2003/078113). In addition, proposed is a robot control method in which one of a plurality of scenarios with the highest priority is selected and executed (for example, Japanese Unexamined Patent Application Publication No. 2013-158869).

SUMMARY

In the technique described in WO 2003/078113, actions executed on the basis of a plurality of pieces of recognition information of the external environment by sight and hearing are assessed for the robot, and the next action is controlled. Thus, it is difficult to regulate the actions because the comprehensive determination becomes extremely complicated, and the technique cannot be disadvantageously applied to the robot that moves in a complicated manner. In addition, the principal object of the action control of the robot is that a human can naturally feel the actions of the robot, and efficiency of some kind of business is not improved through the robot.

In addition, the technique described in Japanese Unexamined Patent Application Publication No. 2013-158869 is used for an industrial robot, and the priority of a scenario to realize an action is determined on the basis of action efficiency derived from time required to execute the scenario, an average speed, and a success rate. Thus, the technique can be applied to a robot that is operated by a scenario of simple work, but cannot be disadvantageously applied to a robot that is operated by a scenario of complicated work such as a counter service job or a customer service.

In consideration of the above-described problems, an objective of the present invention is to promote efficiency improvement of a business by a mobile device that provides services.

In order to solve the above-described problems, the present invention provides a business analysis server that analyzes a business in a mobile device system conducting the business by controlling a mobile device on the basis of a scenario. The business analysis server includes a control unit, and a storage unit including a business index value database that manages a business index value indicating an effect of the business and a business index value history database that manages a change in the business index value as time-series data. The control unit receives scenario execution information representing an execution status of the scenario when a business index value to be improved is designated among the business index values, analyzes a correlation between the business index value to be improved and the scenario by referring to the business index value history database and the scenario execution information, extracts a target scenario whose correlation value with the business index value to be improved satisfies predetermined conditions from the scenario execution information, and generates a correction scenario for correcting the target scenario.

According to the present invention, it is possible to promote efficiency improvement of a business by a mobile device that provides services.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a diagram for showing a configuration example of data managed by the robot;

FIG. 5 is a diagram for showing a configuration example of data managed by the service device;

FIG. 7 is a diagram for showing a configuration example of data managed by the data collection gateway;

FIG. 9 is a diagram for showing a configuration example of data managed by the scenario control server;

FIG. 11 is a diagram for showing a configuration example of data managed by the media processing server;

FIG. 13 is a diagram for showing a configuration example of data managed by the data management server;

FIG. 15 is a diagram for showing a configuration example of data managed by the business analysis server;

FIG. 26 is a diagram for showing a modified example of a structure of data managed by the robot.

DETAILED DESCRIPTION

Hereinafter, an embodiment of the present invention will be described on the basis of the drawings. The following embodiment does not limit the present invention. In addition, the same signs in each drawing for explaining the following embodiment represent constitutional elements having the same or similar functions or processes, and the duplicated explanation thereof will be omitted. In addition, the embodiment and each modified example can be partially or entirely combined within a range of the technical idea of the present invention and a matching range.

(Configuration of Data Analysis System for Mobile Device)

Figure 1:
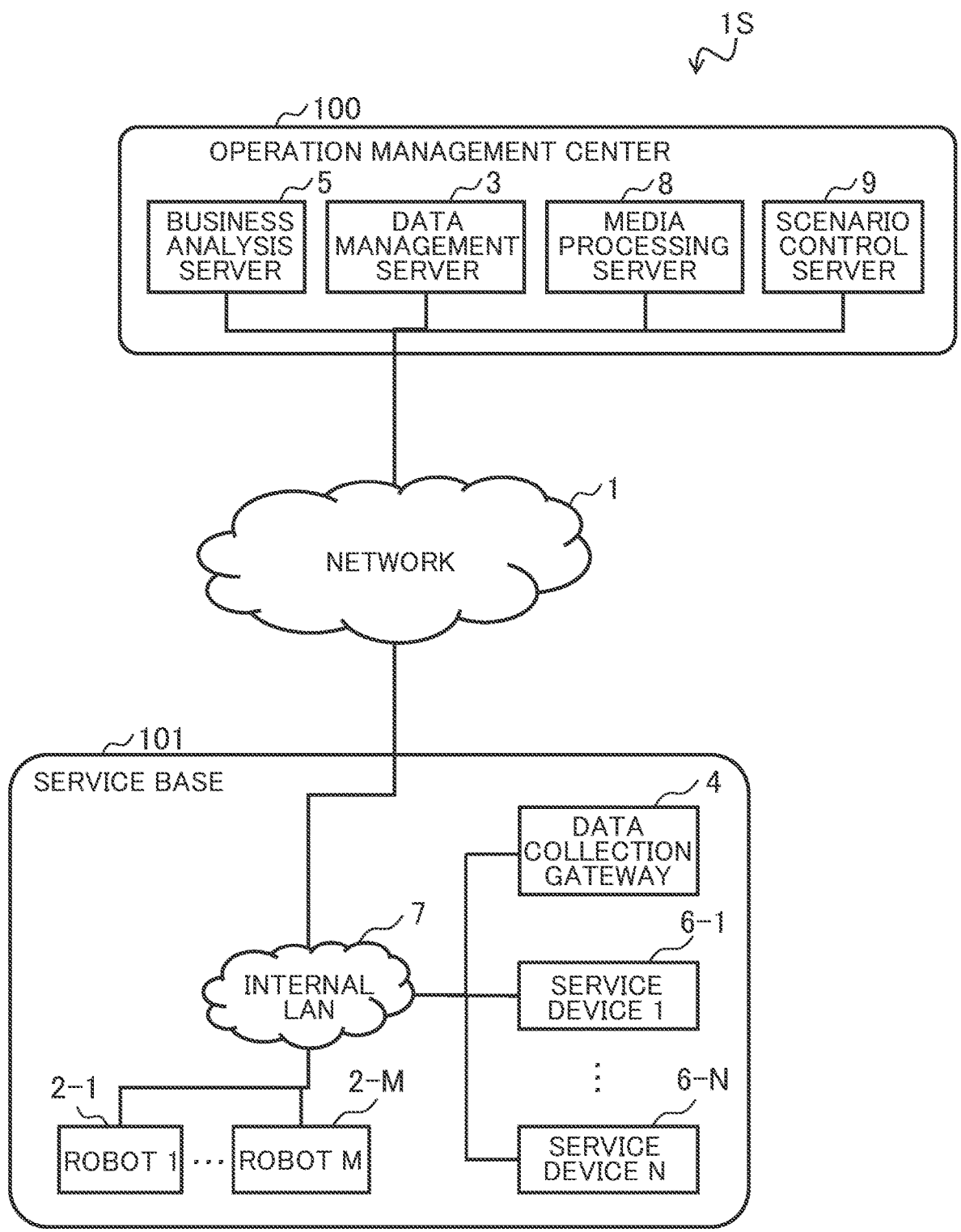
FIG. 1 is a block diagram for showing a configuration example of a data analysis system for mobile devices.

FIG. 1 is a block diagram for showing a configuration example of a data analysis system for mobile devices. A data analysis system for mobile devices 1S includes a service base 101 in which mobile devices are installed and an operation management center 100 in which various servers are installed. A scenario control server 9 that controls operations of the mobile devices, a media processing server 8 that returns a processing result obtained by processing various media such as voices, images, and language collected by the mobile devices, a data management server 3 that accumulates and manages data that can be collected in the system, and a business analysis server 5 that realizes a business analysis by analyzing the accumulated data are installed in the operation management center 100. The service base 101 and the operation management center 100 are connected to each other via a network 1.

The mobile devices are installed in the service base 101 to play a main role in service providing. The mobile devices have a variety of forms, and the embodiment will be described using autonomous robots 2-1 to 2-M (hereinafter, collectively referred to as a robot 2) as the mobile devices. It should be noted that the mobile devices are not limited to robots that provide services to humans using communications, and include devices that can move in a wide range such as drones and automatic driving vehicles.

The robot 2 includes a robot control terminal 21 that executes mechanism control of the robot 2 itself and service control. The robot control terminal 21 is not specialized in execution of an application such as a server, and computer resources such as a processing device, for example, a CPU (Central Processing Unit) that can be used to execute an application, an internal storage device (memory), and an external storage device (storage) are limited. Therefore, a number of services are executed in cooperation with service devices 6-1 to 6-N (hereinafter, collectively referred to as a service device 6) installed outside.

The service device 6 is installed in the service base 101, and is connected to the robot 2 via an internal LAN 7. The robot 2 and the service device 6 collect various data when the system is operating. The service device 6 transmits the collected data to the data management server 3 installed in the operation management center 100 via a data collection gateway 4. The data management server 3 and the business analysis server 5 are installed in the operation management center 100. Servers operated as constitutional elements of the system are used, and servers managed on a cloud that is open to the public are used in some cases.

Next, each device configuring the data analysis system for mobile devices 1S will be described in detail.

(Configuration of Robot)

Figure 2:
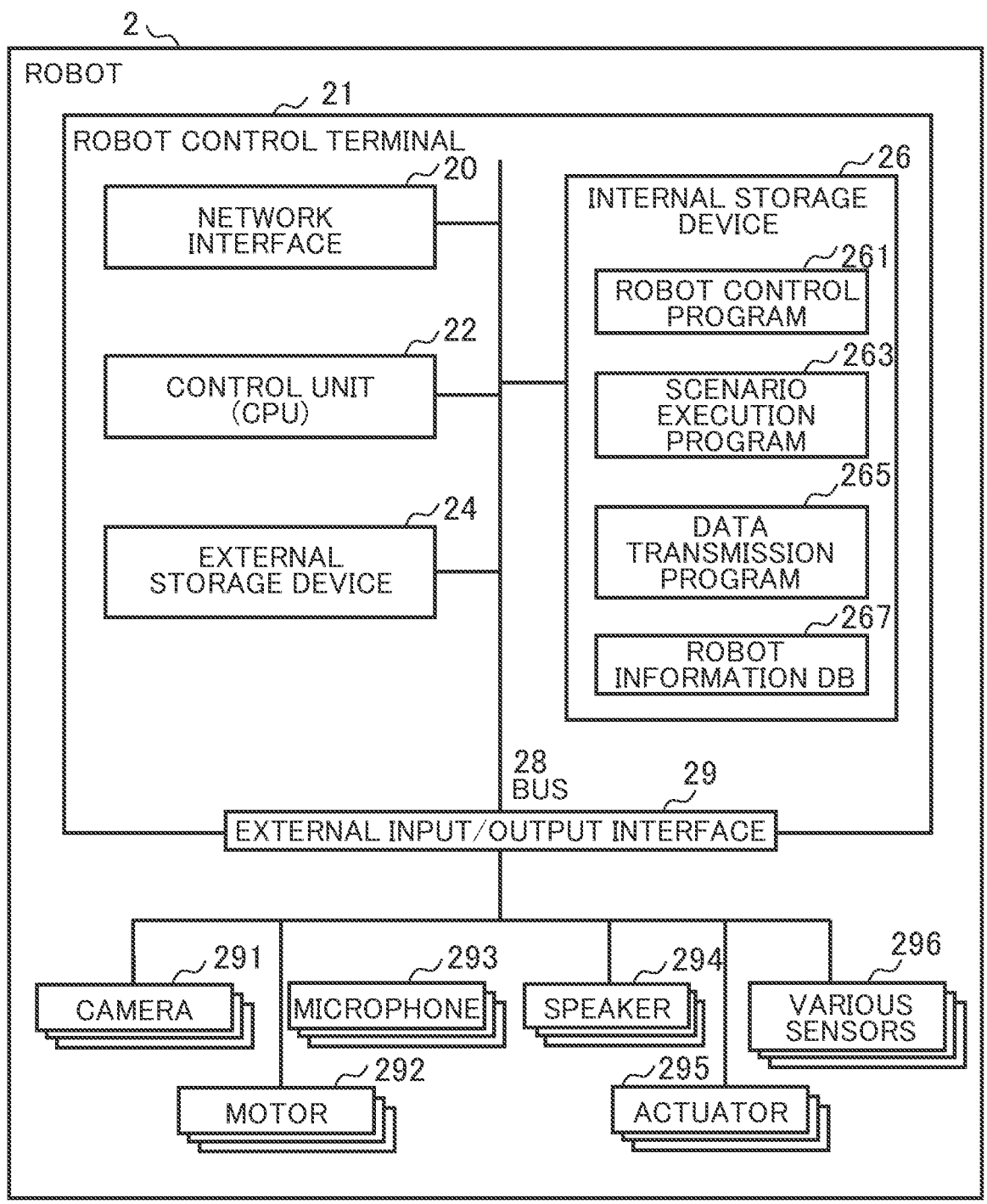
FIG. 2 is a block diagram for showing a configuration example of a robot.

FIG. 2 is a block diagram for showing a configuration example of the robot. The robot 2 includes: the robot control terminal 21; and a camera 291, a motor 292, a microphone 293, a speaker 294, an actuator 295, and various sensors 296 all of which are to be controlled, and the robot control terminal 21 and each device to be controlled are connected to each other via an external input/output interface 29 of the robot control terminal 21. The various sensors 296 include a distance sensor, a measurement region sensor, and the like. The robot control terminal 21 has a control unit (CPU) 22, an internal storage device 26 such as a memory, an external storage device 24 such as a hard disk, and a network interface 20 all of which are connected to a bus 28, and communicates with the outside via the network interface 20.

The internal storage device 26 stores a robot control program 261 that controls the mechanism, posture, movement, and the like of the robot, a scenario execution program 263 that controls execution of services, and a data transmission program 265 that transmits various data collected by the robot.

In addition to these programs, the robot 2 includes a robot information database (DB: Data Base) 267 in which information related to the state of the robot is managed. The robot information DB 267 may be stored in the external storage device 24 in accordance with the scale of the system, the processing performance of the robot control terminal 21, and the like. Data is written into or read from the robot information DB 267 by the robot control program 261 and the scenario execution program 263 installed in the internal storage device 26. When the control unit (CPU) 22 accesses the robot control program 261 and the scenario execution program 263 stored in the internal storage device 26, the control function of the robot 2 is realized.

(Robot Information DB)

FIG. 3 is a diagram for showing a configuration example of data managed by the robot. FIG. 3 shows a data configuration example of the robot information DB 267 stored in the internal storage device 26 of the robot 2. A robot state DB 265 is a database that manages information related to the state of the robot 2 itself, and includes a base identifier of the service base 101 where the robot 2 is installed, a robot identifier that uniquely specifies the robot 2 in the system, an X coordinate and a Y coordinate of the robot 2 in the base, states (robot configuration component states) of various components configuring the robot 2, a scenario identifier that specifies a scenario being executed by the robot 2, an event identifier that specifies an event that has occurred in the scenario being executed, and the date and time of occurrence of the event.

The base identifier is an identifier that uniquely identifies the base, and for example, the name of the base or a character string set according to a naming rule of the system is designated. The robot 2 has a self-position estimating function. The position (the X coordinate and the Y coordinate) of the robot 2 in the service base 101 can be determined by measuring a distance between a surrounding wall and the robot 2 using a laser range finder and the like.

The robot 2 is provided with the camera 291, the motor 292, the microphone 293, the speaker 294, the actuator 295, and the various sensors 296, and thus holds information of configuration components of these units. As the robot configuration component state, there is an operating state of each configuration component, a rotation angle of the motor 292, or the like.

The robot 2 executes a program regulating a series of operations that is referred to as a scenario in order to execute services. The scenario provides a function in accordance with a service to be provided. For example, there is a scenario for guiding a store in commercial facilities, a scenario of sightseeing guidance in an airport, or the like.

The robot information DB 267 manages the scenario identifier for specifying the scenario being executed by the robot 2. The scenario can be recorded into the robot information DB 267 using a specific phenomenon that has occurred during the execution as an event. In the case of the scenario of store guidance in commercial facilities, there is, for example, a phenomenon that a customer was detected, a phenomenon that the name of a store that a customer wishes to go to was specified by voice recognition, a phenomenon that the name of a product that a customer wishes to purchase was specified by an image process, or a phenomenon that a customer left the robot after listening to details of a store. In the robot information DB 267, an identifier for specifying each event and the date and time of occurrence of the event are saved for these events.

(Configuration of Service Device)

Figure 4:
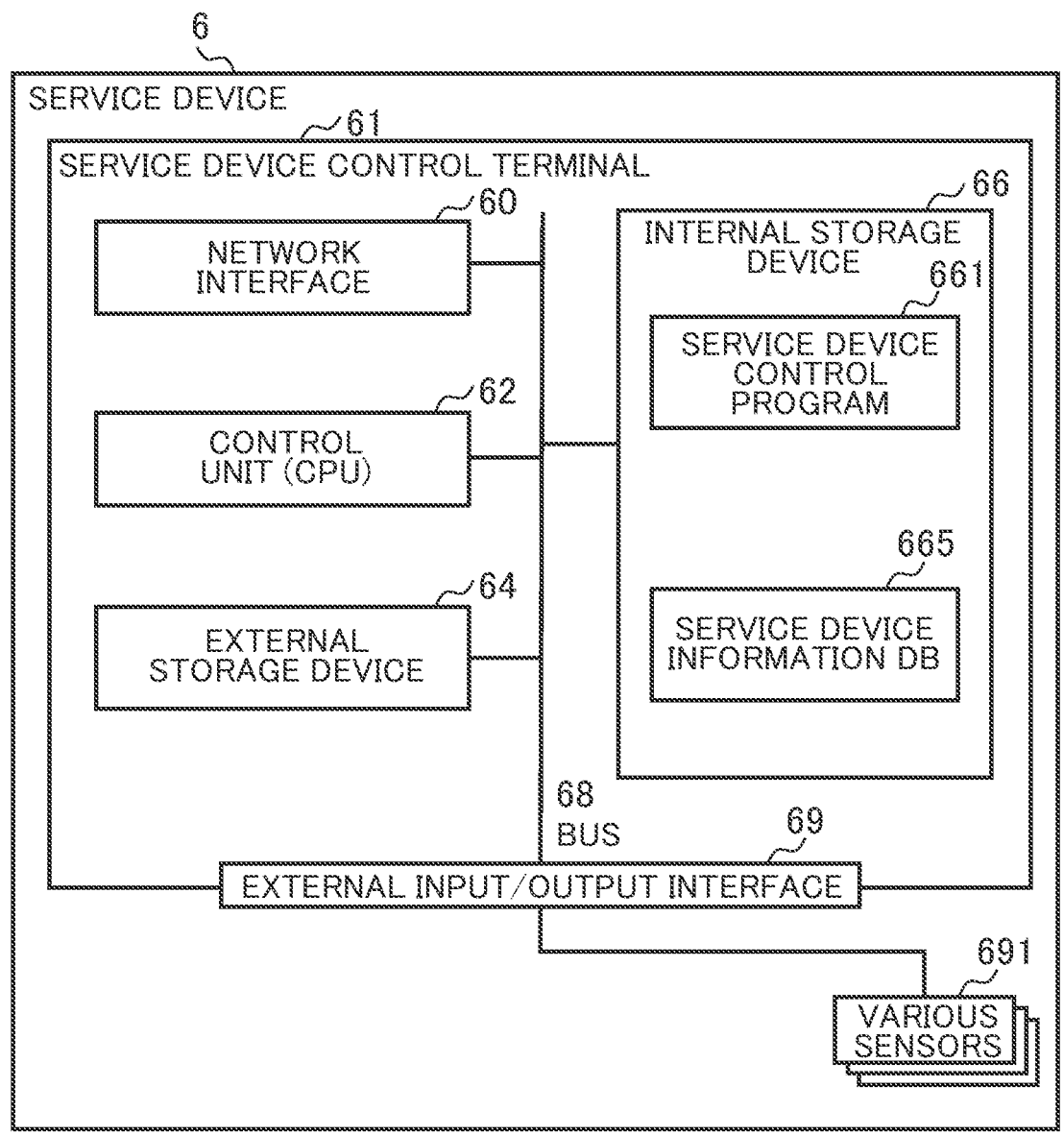
FIG. 4 is a block diagram for showing a configuration example of a service device.

FIG. 4 is a block diagram for showing a configuration example of the service device. The service device 6 includes a service device control terminal 61 and various sensors 691 that obtain various information of the outside, and the service device control terminal 61 and the various sensors 691 are connected to each other via an external input/output interface 69 of the service device control terminal 61.

The various sensors 691 are selected according to purposes, and there is, for example, a human detection sensor that detects approaching of a human, a temperature sensor that detects a temperature, or a pixel sensor. In the case where the pixel sensor is mounted, there is a case that the service device 6 is implemented as a camera provided with an image processing function.

The service device control terminal 61 has a control unit (CPU) 62, an internal storage device 66 such as a memory, an external storage device 64 such as a hard disk, and a network interface 60 all of which are connected to a bus 68, and communicates with the outside via the network interface 60.

A service device control program 661 that extracts various event information by analyzing and processing data obtained via the various sensors 691 is stored in the internal storage device 66. The internal storage device 66 further includes a service device information database (DB) 665 that manages the state of the service device 6. The service device information DB 665 may be stored in the external storage device 64 in accordance with the scale of the system, the processing performance of the service device control terminal 61, and the like. Data is written into or read from the service device information DB 665 by the service device control program 661 installed in the internal storage device 66. When the control unit (CPU) 62 accesses the service device control program 661 stored in the internal storage device 66, the control function of the service device 6 is realized.

(Service Device Information DB)

FIG. 5 is a diagram for showing a configuration example of data managed by the service device. FIG. 5 shows a structure of the service device information DB 665 stored in the internal storage device 66 of the service device control terminal 61. The structure of the service device information DB 665 is the same as that of a service device information DB 463 stored in the internal storage device 46 of the data collection gateway 4, and thus the detailed explanation thereof will be made later with reference to FIG. 7.

(Configuration of Data Collection Gateway)

Figure 6:
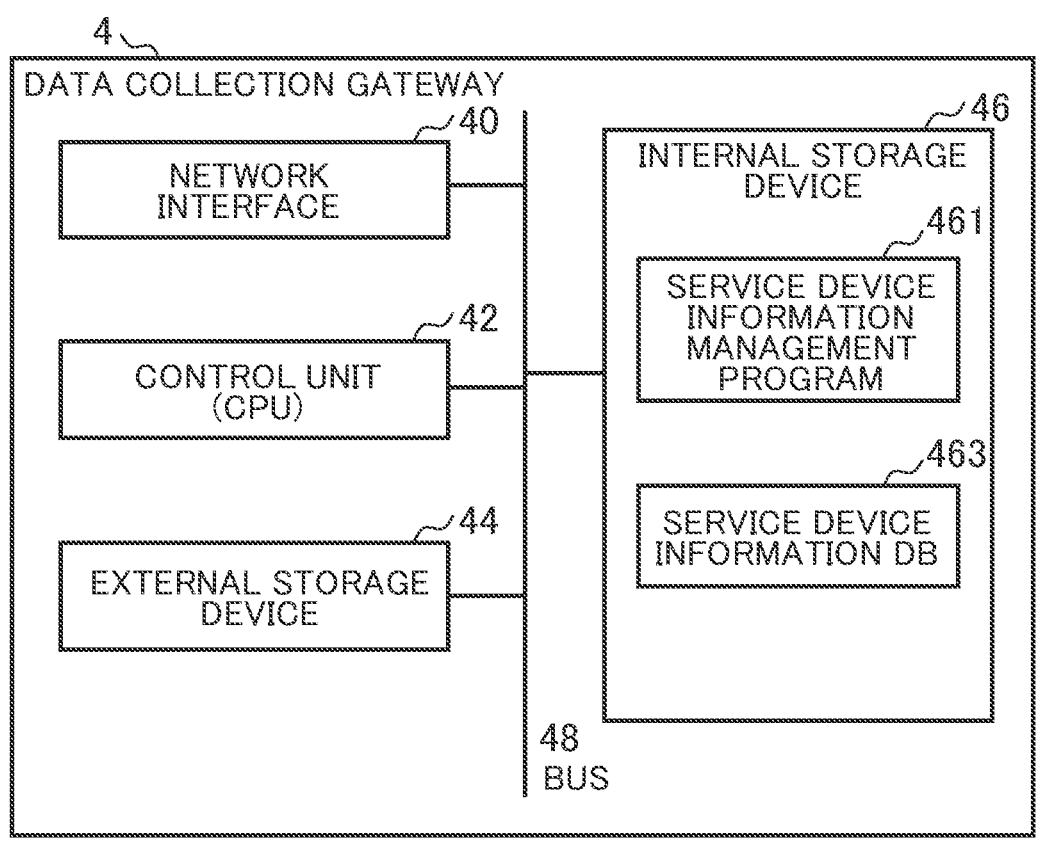
FIG. 6 is a block diagram for showing a configuration example of a data collection gateway.

FIG. 6 is a block diagram for showing a configuration example of the data collection gateway. The data collection gateway 4 has a control unit (CPU) 42, an internal storage device 46 such as a memory, an external storage device 44 such as a hard disk, and a network interface 40 all of which are connected to a bus 48, and communicates with the outside via the network interface 40.

The internal storage device 46 stores a service device information management program 461 that manages information of the service device and the service device information DB 463 in which information of the service device is stored. The service device information management program 461 is installed in the external storage device 44, and is activated by the control unit (CPU) 42 when needed. In addition, the service device information DB 463 may be stored in the external storage device 44 in accordance with the scale of the system, the processing performance of the data collection gateway 4, and the like.

Data is written into or read from the service device information DB 463 by the service device information management program 461 installed in the internal storage device 46. When the control unit (CPU) 42 accesses the service device information management program 461 stored in the internal storage device 46, the data collection gateway 4 executes a management process of the service device.

(Service Device Information DB)

FIG. 7 is a diagram for showing a configuration example of data managed by the data collection gateway. FIG. 7 shows a structure of the service device information DB 463 stored in the internal storage device 46 of the data collection gateway 4. The service device information DB 463 is a database that manages information of the service device for each service base 101, and includes a base identifier that uniquely specifies the service base 101 in the system, a service device identifier that specifies a device that is necessary when providing services, an event identifier that specifies an event detected by the service device, the date and time of occurrence of the event, and position information of the service device. These pieces of information are regularly transmitted to the data management server 3 of the operation management center 100.

(Configuration of Scenario Control Server)

Figure 8:
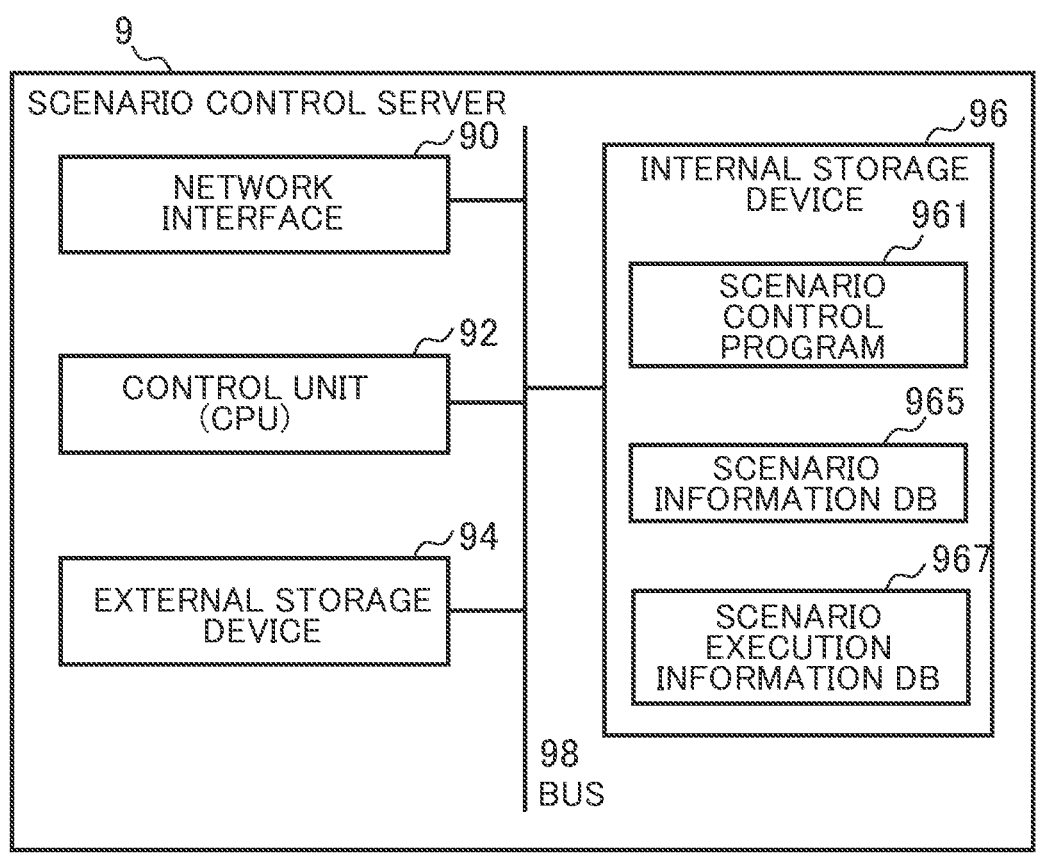
FIG. 8 is a block diagram for showing a configuration example of a scenario control server.

FIG. 8 is a block diagram for showing a configuration example of the scenario control server. The scenario control server 9 has a control unit (CPU) 92, an internal storage device 96 such as a memory, an external storage device 94 such as a hard disk, and a network interface 90 all of which are connected to a bus 98, and communicates with the outside via the network interface 90.

The internal storage device 96 stores a scenario control program 961 that controls an operation scenario of the robot 2. When the control unit (CPU) 92 accesses the scenario control program 961 saved in the internal storage device 96, the scenario control server 9 executes a scenario control process of the robot.

In addition to these programs, the internal storage device 96 includes a scenario information DB 965 that manages a state of the scenario controlling the robot and a scenario execution information DB 967 that manages an execution status (for example, primarily, information related to an event) of the scenario. These databases may be stored in the external storage device 94 in accordance with the scale of the system, the processing performance of the scenario control server 9, and the like.

(Scenario Information DB and Scenario Execution Information DB)

FIG. 9 is a diagram for showing a configuration example of data managed by the scenario control server. FIG. 9 shows structures of the scenario information DB 965 and the scenario execution information DB 967 stored in the internal storage device 96 of the scenario control server 9. The content of the scenario information DB 965 is the same as that of a scenario information DB 364 of the data management server 3, and the content of the scenario execution information DB 967 is the same as that of a scenario execution information DB 367 of the data management server 3. Thus, the detailed explanation thereof will be made later with reference to FIG. 13.

(Configuration of Media Processing Server)

Figure 10:
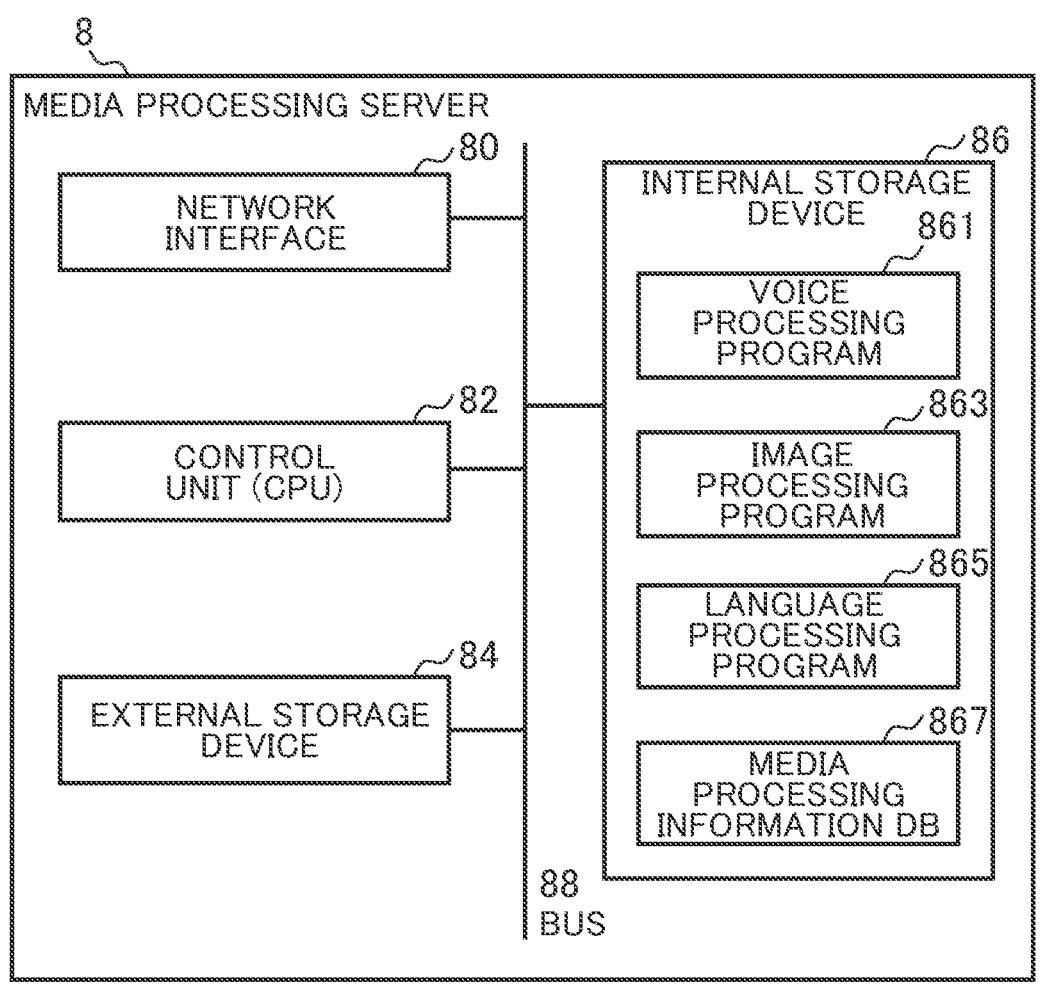
FIG. 10 is a block diagram for showing a configuration example of a media processing server.

FIG. 10 is a block diagram for showing a configuration example of the media processing server. The media processing server 8 has a control unit (CPU) 82, an internal storage device 86 such as a memory, an external storage device 84 such as a hard disk, and a network interface 80 all of which are connected to a bus 88, and communicates with the outside via the network interface 80.

The internal storage device 86 stores, as programs performing various media processes, a voice processing program 861, an image processing program 863, and a language processing program 865. When the control unit (CPU) 82 accesses each program saved in the internal storage device 86, the media processing server 8 executes the various media processes. In addition to these programs, the media processing server 8 includes a media processing information DB 867 storing results of the media processes. The media processing information DB 867 may be stored in the external storage device 84 in accordance with the scale of the system, the processing performance of the media processing server 8, and the like.

(Media Processing Information DB)

FIG. 11 is a diagram for showing a configuration example of data managed by the media processing server. FIG. 11 shows a structure of the media processing information DB 867 stored in the internal storage device 86 of the media processing server 8. The content of the media processing information DB 867 is the same as that of a media processing information DB 369 of the data management server 3, and thus the detailed explanation thereof will be made later with reference to FIG. 13.

(Configuration of Data Management Server)

Figure 12:
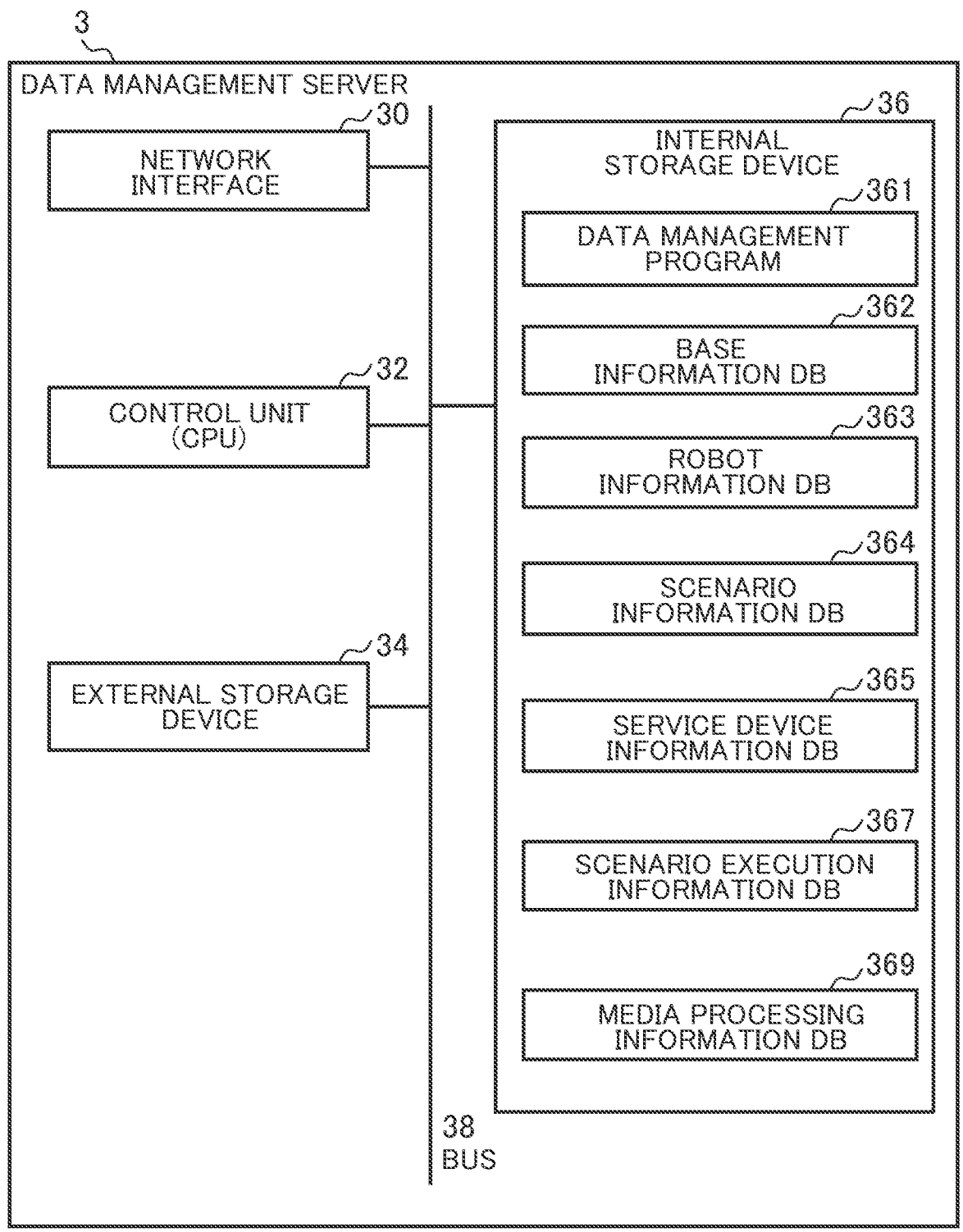
FIG. 12 is a block diagram for showing a configuration example of a data management server.

FIG. 12 is a block diagram for showing a configuration example of the data management server. The data management server 3 has a control unit (CPU) 32, an internal storage device 36 such as a memory, an external storage device 34 such as a hard disk, and a network interface 30 all of which are connected to a bus 38, and communicates with the outside via the network interface 30.

The internal storage device 36 stores a data management program 361 that provides a data management function. The data management program 361 is installed in the external storage device 34, and is activated by the control unit (CPU) 32 at start of operation of the system.

In addition to the data management program 361, the data management server 3 includes a base information DB 362 that manages information of the service base 101, a robot information DB 363 that manages information of the robot 2 installed in the service base 101, a scenario information DB 364 that manages a state of the scenario controlling the robot 2, a service device information DB 365 that manages information of the service device, a scenario execution information DB 367 that manages an execution status (for example, primarily, information related to an event) of the scenario, and a media processing information DB 369 that stores results of media processes for voices, images, and the like executed through the robot 2 and the media processing server 8. These databases may be stored in the external storage device 34 in accordance with the scale of the system, the processing performance of the data management server 3, and the like. Data is written into or read from each database by the data management program 361 installed in the internal storage device 36. When the control unit (CPU) 32 accesses the data management program 361 saved in the internal storage device 36, the data management server 3 executes a data management process.

(Each DB Managed by Data Management Server)

FIG. 13 is a diagram for showing a configuration example of data managed by the data management server. FIG. 13 shows a structure of each database stored in the internal storage device 36 of the data management server 3.

The base information DB 362 is a database that manages information of the service base 101, and includes a base identifier that uniquely specifies the service base 101 and a base map identifier that specifies a sketch of the service base 101. A base map has data related to X coordinates and Y coordinates, and the robot 2 can recognize the position of itself in the map by self-position estimation.

In general, the service base 101 is divided into a plurality of physical blocks depending on the purpose in many cases. For example, in the case of commercial facilities, each store occupies a fixed space to provide services to visitors. In order to distinguish the physical blocks from each other, the base information DB 362 further manages the range of X coordinates and the range of Y coordinates in the base map, a location identifier corresponding to these coordinate ranges, an identifier of a business type provided in the location specified by the location identifier, and an identifier of a business. The business type indicates the broad category of the business, and the business shows a specific business in a business type.

The content of the robot information DB 363 is the same as that of the robot information DB 267 of the robot 2, and thus the explanation thereof is omitted.

The scenario information DB 364 includes a base identifier that represents a base where the robot 2 with the scenario operated is installed, a robot identifier that specifies the robot 2, a scenario identifier that specifies a scenario controlling the operation of the robot 2, a state identifier that represents a state during the scenario, a business identifier that specifies a business realized by the scenario, an input source identifier that represents the robot 2 or the service device 6 having input the robot information, an action identifier that specifies an action executed by the robot in a state represented by the state identifier, the execution date and time of the action, the duration of the action, and a transition destination state transited after executing the action.

The scenario is represented by time-series actions actively conducted by the robot. As the content of the action, there is an action that the robot spoke to a human in front of the robot, an action that the robot recognized the voice of the human, an action that the robot understood the content of a question asked by the human and answered, or an action that the robot waved to the human. As the duration of the action, a period of time required for the action is set. In the case where an action that the robot 2 raises its arm is executed, an action of a case in which the arm is raised immediately above the robot 2 from its side in three seconds is different from a case in five seconds. When the movement of the body of the robot 2 is exemplified, the duration of the action is used to control the moving speed of the robot. When the speech of the robot 2 is exemplified, the duration of the action affects the speech speed.

The content of the service device information DB 365 is obtained by adding the robot identifier to the content of the service device information DB 463 of the data collection gateway 4. The robot identifier identifies the robot 2 associated with the service device 6. As a method of identifying the association between the service device 6 and the robot 2, there is a method in which the robot 2 is assumed as being associated with the service device 6 when the robot 2 is located nearby in a predetermined range of the service device 6 using the installation position of the service device 6 and the X coordinate and the Y coordinate of the robot 2 managed by the robot information DB 363, and the corresponding robot identifier is stored into those of the service device information DB 365.

The scenario execution information DB 367 is a database that manages information of an event that occurred during the execution of a scenario, and includes a base identifier that represents a base where the robot 2 with the scenario operated is installed, a robot identifier that specifies the robot 2, a scenario identifier that specifies the scenario controlling the operation of the robot 2, an event identifier that specifies an event that occurred during the execution of the scenario, the date and time of occurrence of the event, and an event success/failure that indicates whether the event is advantageous or disadvantageous for a system operator.

The event represents state transition that occurs by being transited to a specific state of a scenario and has a special meaning in services. For example, when considering a case in which the robot 2 explains about a product to a visitor in commercial facilities, an event of product purchase occurs if the visitor purchases the product as a result of the explanation by the robot 2. The purchase of the product is a desirable result for a system operator, and thus a positive value is stored in the event success/failure because the event is advantageous for the system operator. In the case where the event that occurred is an undesirable result for the system operator, a negative value is stored in the event success/failure. For example, this event corresponds to a case in which the visitor did not listen to the explanation of the product to the end and left without purchasing the product or a case in which the visitor got angry.

The media processing information DB 369 is a database that stores results of media processes, and includes a base identifier that represents a base where the robot 2 with the scenario operated is installed, a robot identifier that specifies the robot 2, a scenario identifier that specifies the scenario controlling the operation of the robot 2, a media type for processing, processing content and a processing result, and processing accuracy.

Since the robot 2 provides services to a human, it is necessary to process media used by a human in communications. The media are primarily classified into three such as voices, images, and language, and processing content associated with each of the media is stored as data. In the case of voices, the processing content is voice recognition, noise elimination, or the like. In the case of images, the processing content is human detection, sex detection, age estimation, or the like. In the case of language, the processing content is natural language processing, translation, or the like. The media process is not necessarily processed with absolute accuracy, and a result that does not secure accuracy (precision) is returned in some cases. For example, if the accuracy of voice recognition is 80%, 80% of voice recognition results are correct, and 20% of voice recognition results are incorrect. Accordingly, not only the processing result but also the processing accuracy is managed in the media processing information DB 369.

(Configuration of Business Analysis Server)

Figure 14:
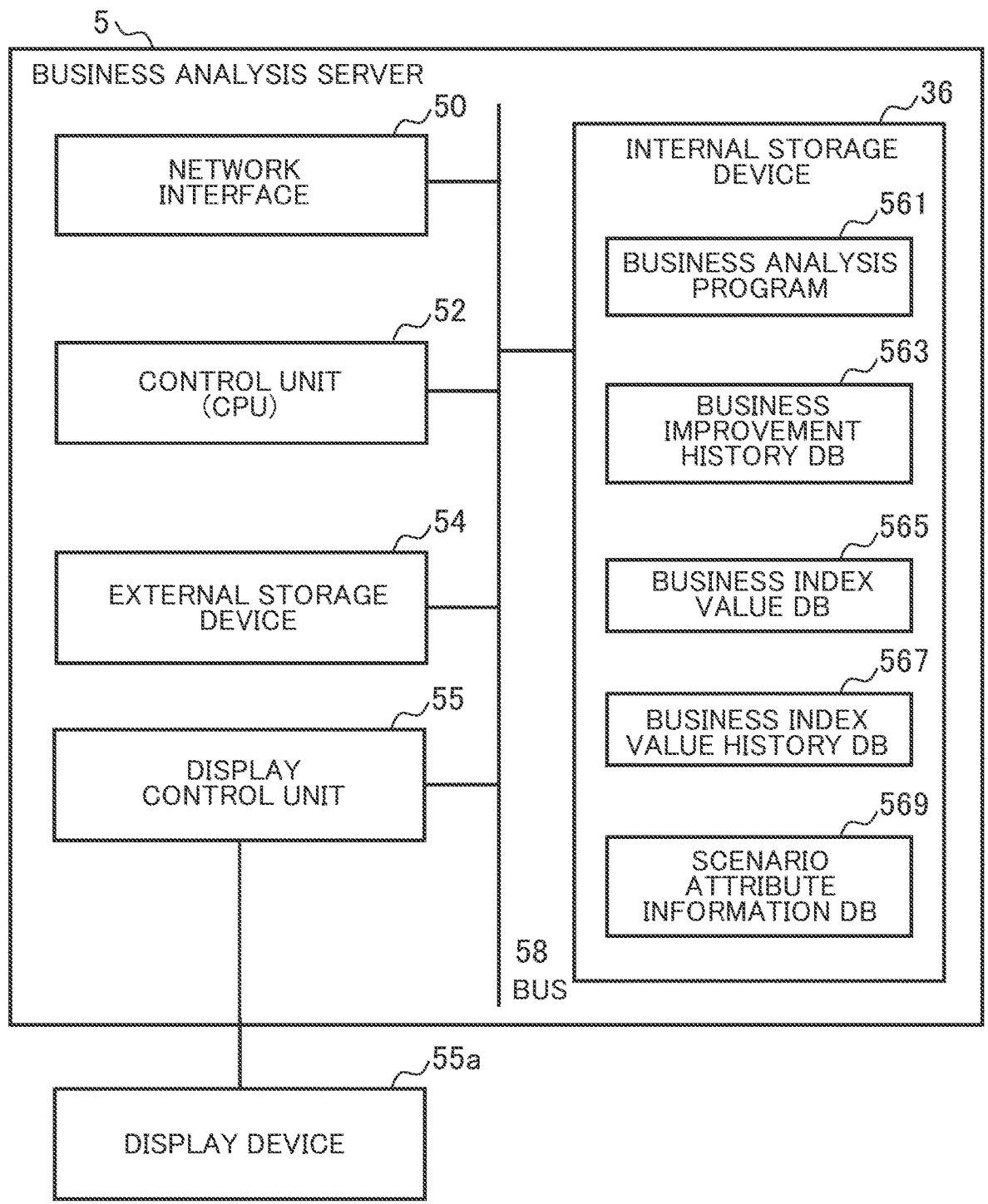
FIG. 14 is a block diagram for showing a configuration example of a business analysis server.

FIG. 14 is a block diagram for showing a configuration example of the business analysis server. The business analysis server 5 has a control unit (CPU) 52, an internal storage device 56 such as a memory, an external storage device 54 such as a hard disk, a display control unit 55 to which a display device 55*a* for displaying a GUI (to be described later with reference to FIG. 23) is connected, and a network interface 50 all of which are connected to a bus 58, and communicates with the outside via the network interface 50. The internal storage device 56 stores a business analysis program 561 that extracts a business improvement measure of the system by conducting a business analysis with a data analysis. When the control unit (CPU) 52 accesses the business analysis program 561 stored in the internal storage device 56 on the basis of business improvement trial conditions set and input by a business analysis executant via GUI (Graphical User Interface) displayed on the display device 55*a*, the business analysis server 5 executes a business analysis through the system.

In addition to the business analysis program 561, the business analysis server 5 includes a business improvement history DB 563 that manages a history of applying the business improvement measure, a business index value DB 565 that manages a business index value to be improved, a business index value history DB that manages a change in the business index value as time-series data, and a scenario attribute information DB 569 that represents a relation between the scenario and the business index value. These databases may be stored in the external storage device 54 in accordance with the scale of the system, the processing performance of the business analysis server 5, and the like.

(DB Managed by Business Analysis Server)

FIG. 15 is a diagram for showing a configuration example of data managed by the business analysis server. FIG. 15 shows a structure of each database stored in the internal storage device 56 of the business analysis server 5.

The business improvement history DB 563 manages information related to an improvement history of the business index value executed through the system, and includes the identifier of the service base 101 where the robot 2 is arranged, the identifier of the robot 2, the identifier of a location, a business identifier that specifies a business, the identifier of the improved business index value, a scenario identifier that specifies a scenario that contributed to the improvement, a correction content of the scenario, a trial period of the improvement measure, room for improvement of the business index value, and the application date and time of the business improvement.

The business index value DB 565 is a database that manages information related to a business index value to be improved, and includes the identifier of a base where services are provided through the robot 2 and a business identifier representing a business index value to be improved.

The business index value is a benefit that a service provider expects to have, and is the sales, the customer attraction rate, or the like of a store in commercial facilities as an extreme example. The business improvement measure proposed by the system does not necessarily assure improvement of an effect. Thus, in the case where an effect is verified in a fixed trial period and can be recognized, it is necessary to apply the business improvement measure. Therefore, there is a trial period recommended for each business index value. The business index value DB 565 manages the period as a scenario correction trial period.

In addition, a correlation analysis is conducted to extract a scenario deeply relevant to a business index value to be improved. However, a correction method of the scenario differs depending on the degree of correlation. In order to realize this, the business index value DB 565 manages threshold values to measure the relevancy between the business index value and the scenario by classifying into three such as a scenario relevancy threshold value 1, a scenario relevancy threshold value 2, and a scenario relevancy threshold value 3.

The business index value history DB 567 is a database that manages the transition of the business index value as time-series data, and includes a base identifier that specifies a base, a business index value identifier to be verified, an observed business index value, and the observation date and time of the business index value.

The scenario attribute information DB 569 is a database that manages a scenario and a business index value to be verified, and includes a base identifier, a scenario identifier, a business index value identifier to be verified, an observed business index value, the observation date and time of the business index value.

Next, an entire operation of the data analysis system for mobile devices 1S according to the embodiment will be described. First, a basic process in which the robot 2 executes a scenario will be described using a sequence diagram of FIG. 16.

(Process in which Robot Executes Scenario in Accordance with Media Processing Result)

Figure 16:
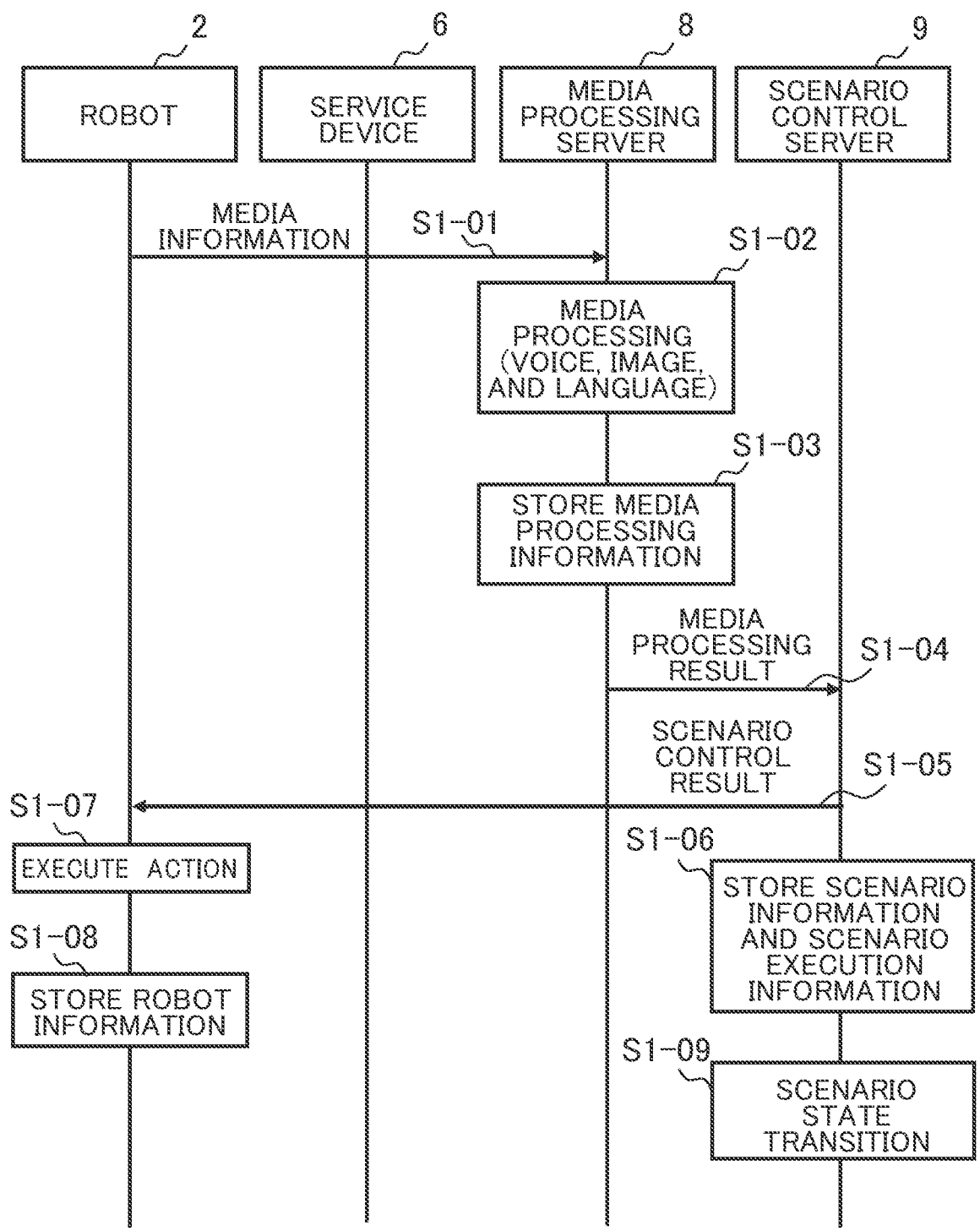
FIG. 16 is a sequence diagram for showing a processing example in which the robot executes a scenario in accordance with a media processing result.

FIG. 16 is a sequence diagram for showing a processing example in which the robot executes a scenario in accordance with a media processing result. The robot 2 is operated according to the scenario managed by the scenario control server 9. Media information such as voices, images, and language collected through the robot 2, a processing result output from the service device 6, or the like is input to the scenario.

The robot 2 transmits media information (media data) collected through the microphone 293 and the camera 291 to the media processing server 8 (Step S1-01). When receiving the media information transmitted in Step S1-01, the media processing server 8 performs a media process in accordance with the type (voices, images, language, or the like) of the received media information (Step S1-02). When the media information is a voice, it is conceivable that noise is removed from the original voice to increase a voice recognition rate, or that the voice is converted into text by voice recognition.

After obtaining target processing results by one or more media processes, the media processing server 8 stores the processing results into the media processing information DB 867 (Step S1-03). Thereafter, the media processing server 8 transmits the media processing results to the scenario control server 9 (Step S1-04). The scenario control server 9 determines the next action executed by the robot on the basis of the received media processing results and the state of the scenario for the robot 2, and transmits the determined result to the robot 2 as a scenario control result (Step S1-05).

The scenario control result includes a control parameter necessary for the robot 2 to execute the action. If the content of the action is speaking, the content spoken by the robot 2 is stored in a voice file, and the robot 2 reproduces the voice file to achieve the goal. If the content of the action is motion such as arm swinging or nodding, the scenario control result includes a rotation angle to control the motor. If the action is a movement, the X coordinate and the Y coordinate of a destination are transmitted from the scenario control server 9 to the robot 2 as a control parameter.

The scenario control server 9 having transmitted the scenario control result to the robot 2 stores scenario information and scenario execution information obtained through a series of processes into the scenario information DB 965 and the scenario execution information DB 967, respectively (Step S1-06).

The robot 2 having received the scenario control result executes the action in accordance with a designated control parameter (Step S1-07), and stores the execution result of the action into the robot information DB 267 as robot information (Step S1-08). After the execution of the action by the robot 2, the scenario control server 9 executes the state transition of the scenario (Step S1-09).

(Process in which Robot Executes Scenario in Accordance with Processing Result of Service Device)

Figure 17:
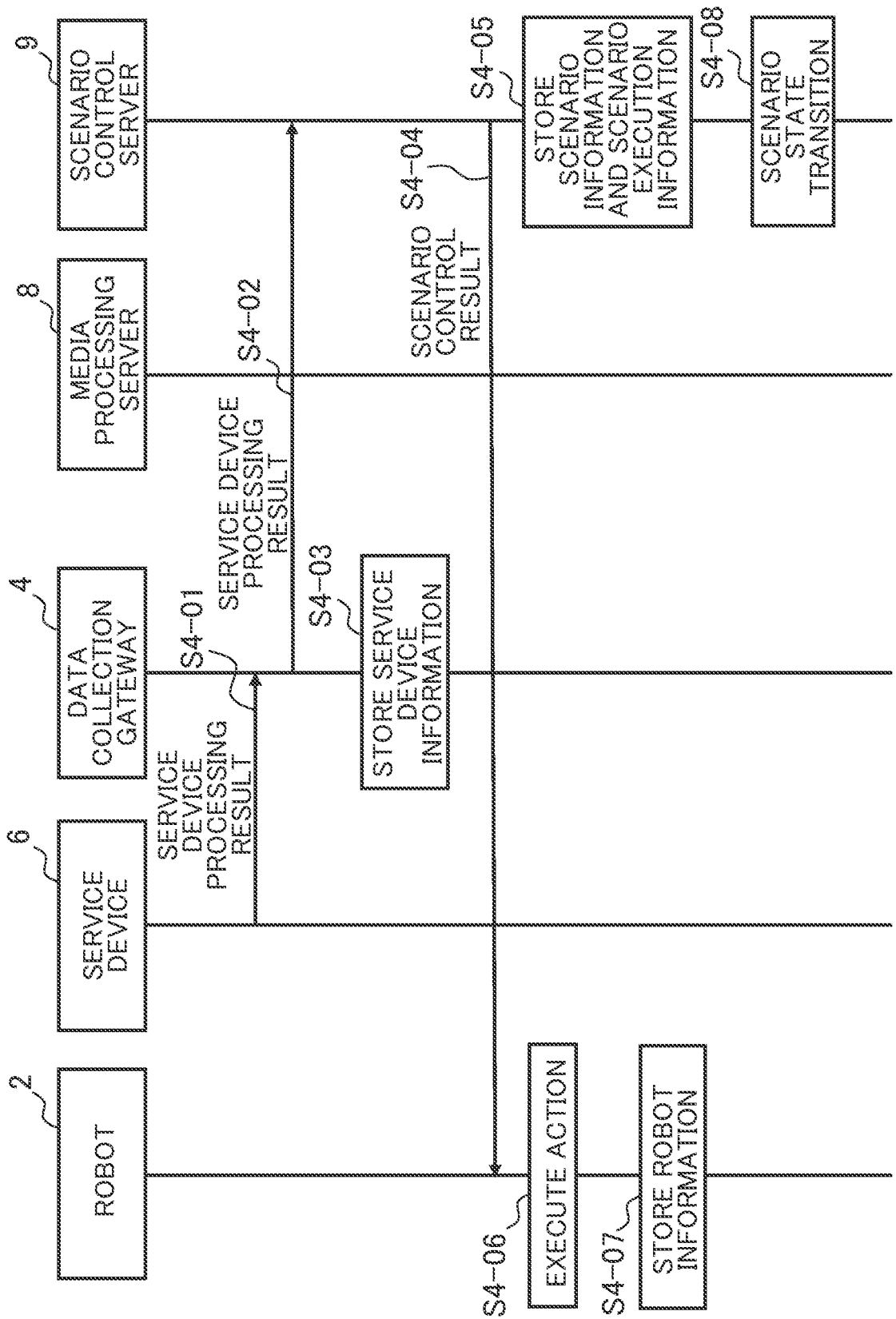
FIG. 17 is a sequence diagram for showing a processing example in which the robot executes a scenario in accordance with a processing result of the service device.

The scenario is controlled using an input by the robot 2 itself or the service device 6 in some cases. FIG. 17 is a sequence diagram for showing a processing example in which the robot executes the scenario in accordance with the processing result of the service device. FIG. 17 shows an example in which the scenario control and the state transition of the scenario occur with an input from the service device 6.

The service device 6 can be used as an output device that presents information such as a signage. However, it is typically assumed to use a device that detects a phenomenon of the outside such as an environmental camera or a human detection sensor as some kind of event. For example, it is assumed that the service device 6 is an environmental camera and the environmental camera detected that a visitor entered within the imaging range. The service device 6 transmits the processing result to the scenario control server 9 via the data collection gateway 4 (Steps S4-01 and S4-02).

The data collection gateway 4 stores the service device processing result received from the service device 6 into the service device information DB 463 as service device information (Step S4-03). The scenario control server 9 having received the service device processing result determines the next action to be executed by the robot 2 on the basis of the received service device processing result and the state of the scenario for the robot 2, and transmits the determination result to the robot 2 as a scenario control result (Step S4-04). The processes of Steps S4-05 to S4-08 thereafter are the same as those of Steps S1-06 to S1-09 of FIG. 16.

By repeating the processes of FIG. 16 and FIG. 17, the scenario controlling the robot 2 proceeds, and various kinds of data are accumulated in the robot 2, the service device 6, the scenario control server 9, and the media processing server 8 in accordance with the proceeding of the scenario. The various kinds of data are transmitted to the data management server 3 at predetermined cycles or timing as shown in FIG. 18.

(Process in which Data Management Server Collects Various Kinds of Data)

Figure 18:
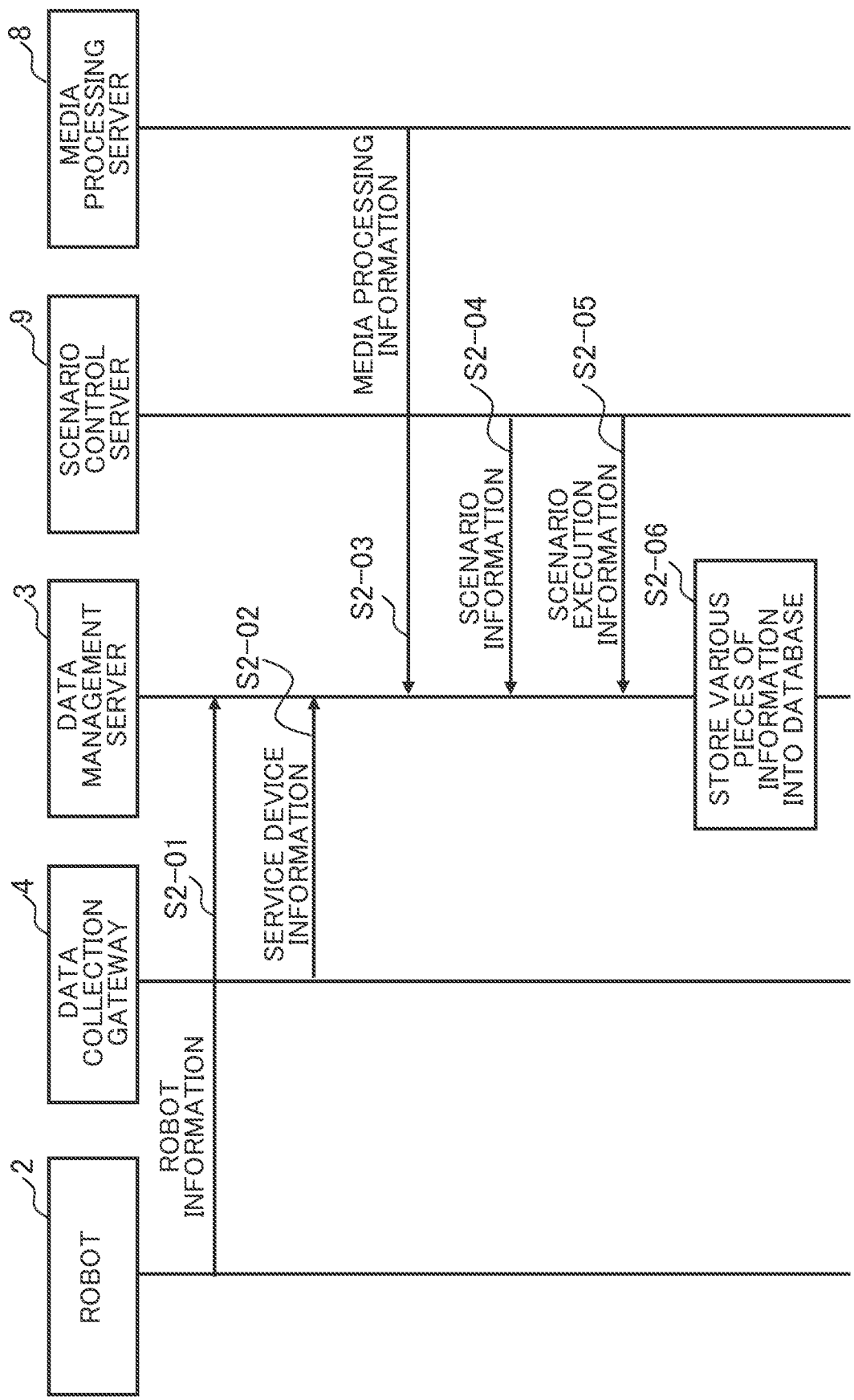
FIG. 18 is a sequence diagram for showing a processing example in which the data management server collects various kinds of data.

FIG. 18 is a sequence diagram for showing a processing example in which the data management server collects various kinds of data. FIG. 18 shows a state in which the robot 2, the data collection gateway 4, the scenario control server 9, and the media processing server 8 transmit analysis data to the data management server 3.

The robot information managed by the robot 2 in the robot information DB 267 is transmitted from the robot 2 to the data management server 3 (Step S2-01). The service device information managed by the service device 6 in the service device information DB 665 is aggregated and managed in the service device information DB 463 of the data collection gateway 4, and is transmitted from the data collection gateway 4 to the data management server 3 (Step S2-02).

The media process information managed by the media processing server 8 in the media processing information DB 867 is transmitted from the media processing server 8 to the data management server 3 (Step S2-03). The scenario information managed by the scenario control server 9 in the scenario information DB 965 and the scenario execution information managed in the scenario execution information DB 967 are transmitted from the scenario control server 9 to the data management server 3 (Steps S2-04 and S2-05).

The data management server 3 having received the various kinds of data in Steps S2-01, S2-02, S2-03, S02-04, and S2-05 stores the various kinds of received data into the corresponding databases (Step S2-06). The various kinds of data are transmitted at different cycles or timing depending on the robot 2, the data collection gateway 4, the scenario control server 9, and the media processing server 8, and the timing at which the data management server 3 stores the data differs.

It should be noted that the data management server 3 stores all the received data into the corresponding databases in Step S2-06 of in FIG. 18. However, all the data are not necessarily transmitted in order in an actual process, and are stored in order every time the data arrives in some cases.

(Business Analysis Process)

Figure 19:
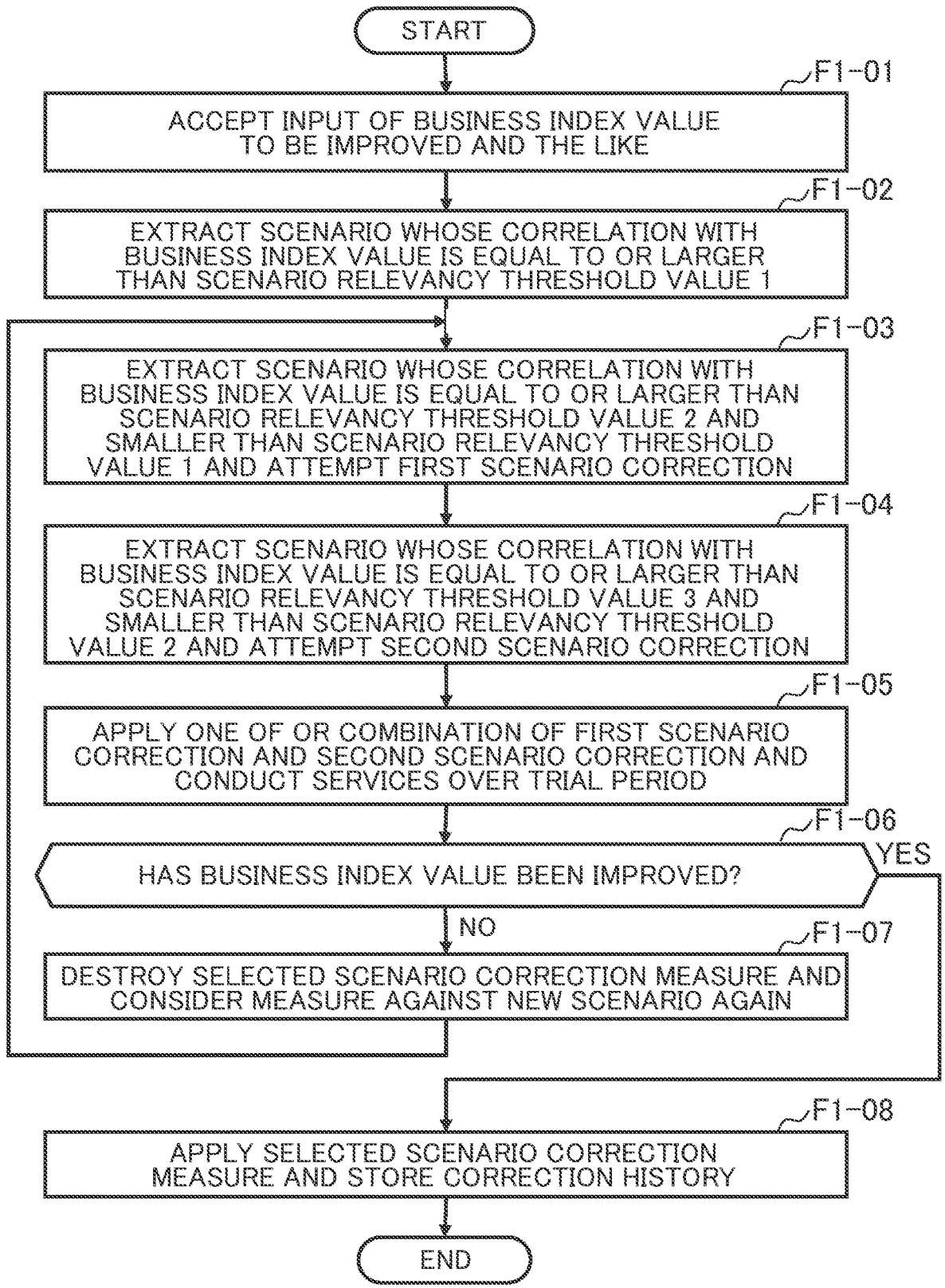
FIG. 19 is a flowchart for showing an example of a business analysis process.

Next, a business analysis process in which the business analysis server 5 extracts a business improvement measure using various data accumulated in the data management server 3 will be described. FIG. 19 is a flowchart for showing an example of the business analysis process.

In the business analysis process, the business analysis server 5 first accepts the service base 101 for business analysis, a business index value to be improved, an improvement target value of the business index value, and a trial period, all of which are input by a business analyst via a GUI (to be described later with reference to FIG. 23) displayed on the display device 55a connected to the business analysis server 5 (Step F1-01).

The business index value is an index value indicating performance in a business, and the performance is improved by improving the business index value. The performance index value includes an index with which an indirect effect such as customer satisfaction and product satisfaction is measured, in addition to an index with which a direct effect such as sales, the number of visitors, and a customer attraction rate can be measured. The business index value is required to be regularly measurable by some method as similar to other data. For example, if the business index value is sales, the business index value can be regularly obtained in conjunction with a business system that manages a buying and selling history and account information in the service base 101. These business index values are managed in the business index value history DB 567 of the business analysis server 5 as time-series data.

When the business index value to be improved is selected in Step F1-01, the business analysis server 5 performs a correlation analysis using the time-series data of the business index values managed in the business index value history DB 567 and the scenario execution information DB 367 of the data management server 3, and extracts a scenario having a high correlation with the business index value from the scenario execution information DB 367.

Here, the correlation with the business index value is classified using three threshold values managed in the business index value DB 565, namely, the scenario relevancy threshold value 1, the scenario relevancy threshold value 2, and the scenario relevancy threshold value 3. These threshold values have a magnitude relation of "scenario relevancy threshold value 1>scenario relevancy threshold value 2>scenario relevancy threshold value 3". Since a scenario whose correlation value with the business index value is equal to or larger than the scenario relevancy threshold value 1 is highly related to the business index value, the business analysis server 5 continues to use the scenario without particularly correcting the same (Step F1-02). Accordingly, the scenario can be efficiently corrected without generating a corrected scenario that does not contribute to the improvement of the business index value.

In addition, the success rate of a scenario whose correlation value with the business index value is equal to or larger than the scenario relevancy threshold value 2 and smaller than the scenario relevancy threshold value 1 is increased by a minor correction such as execution timing of motion or pausing a moment in speech. Namely, the number of success examples in the event success/failure of the scenario execution information DB 367 is expected to increase. Accordingly, the business analysis server 5 attempts a first scenario correction for the scenario whose correlation with the business index value is equal to or larger than the scenario relevancy threshold value 2 and smaller than the scenario relevancy threshold value 1 (Step F1-03).

In addition, it is conceivable that drastic measures need to be taken against a scenario whose correlation value with the business index value is equal to or larger than the scenario relevancy threshold value 3 and smaller than the scenario relevancy threshold value 2. For example, a case in which content corresponding to information that a visitor wishes to know is missing is conceivable. For such a case, a second scenario correction is attempted to improve the scenario by analyzing the media process information (Step F1-04).

It should be noted that it is determined that a scenario whose correlation value with the business index value is smaller than the scenario relevancy threshold value 3 is less relevant to the business index value, and the scenario is not used when conducting services over a trial period to be described later in Step F1-05. Alternatively, it is determined that the scenario whose correlation with the business index value is smaller than the scenario relevancy threshold value 3 does not contribute to the business index value input in Step F1-01, and the scenario is excluded from those used when providing actual services so that useless control of the robot 2 on the basis of the scenario that does not contribute to the business index value may be eliminated. The attempts of the first scenario correction and the second scenario correction will be described later in detail.

The business analysis server 5 applies the attempt of one of or a combination of the first scenario correction and the second scenario correction, conducts services over the trial period designated on the GUI (see FIG. 23), and records the business index value (Step F1-05). After the trial period passes, the business analysis server 5 determines whether or not the business index value has been improved, namely, the presence or absence of improvement of the business index value (Step F1-06). Accordingly, the presence or absence of improvement of the business index value by conducting services on the basis of the attempt of one or more scenario corrections can be efficiently verified in one trial period. Here, the improvement of the business index value means accomplishment of the improvement target value of the business index value accepted in Step F1-01. However, the improvement of the business index value is not limited to the accomplishment of the improvement target value of the business index value, but may be a case in which the business index value is improved by a predetermined value or larger or a predetermined ratio or lager.

If the business index value has been improved (Step F-106: YES), the business analysis server 5 employs the attempt of the conducted scenario correction, and thus perpetuates the selected scenario correction. The business analysis server 5 continues to provide services by reflecting the selected scenario correction on the scenario controlling the robot 2, and saves this correction history into the business improvement history DB 563 (Step F1-08).

If the business index value has not been improved (Step F1-06: NO), the business analysis server 5 discards the correction attempt for the selected scenario, and attempts a correction for a different scenario. Then, the business analysis server 5 conducts services over a trial period in accordance with the attempt of the correction for the different scenario again, and records the business index value (Steps F1-07, F1-03, F1-04, and F1-05).

(Process of First Scenario Correction)

Figure 20:
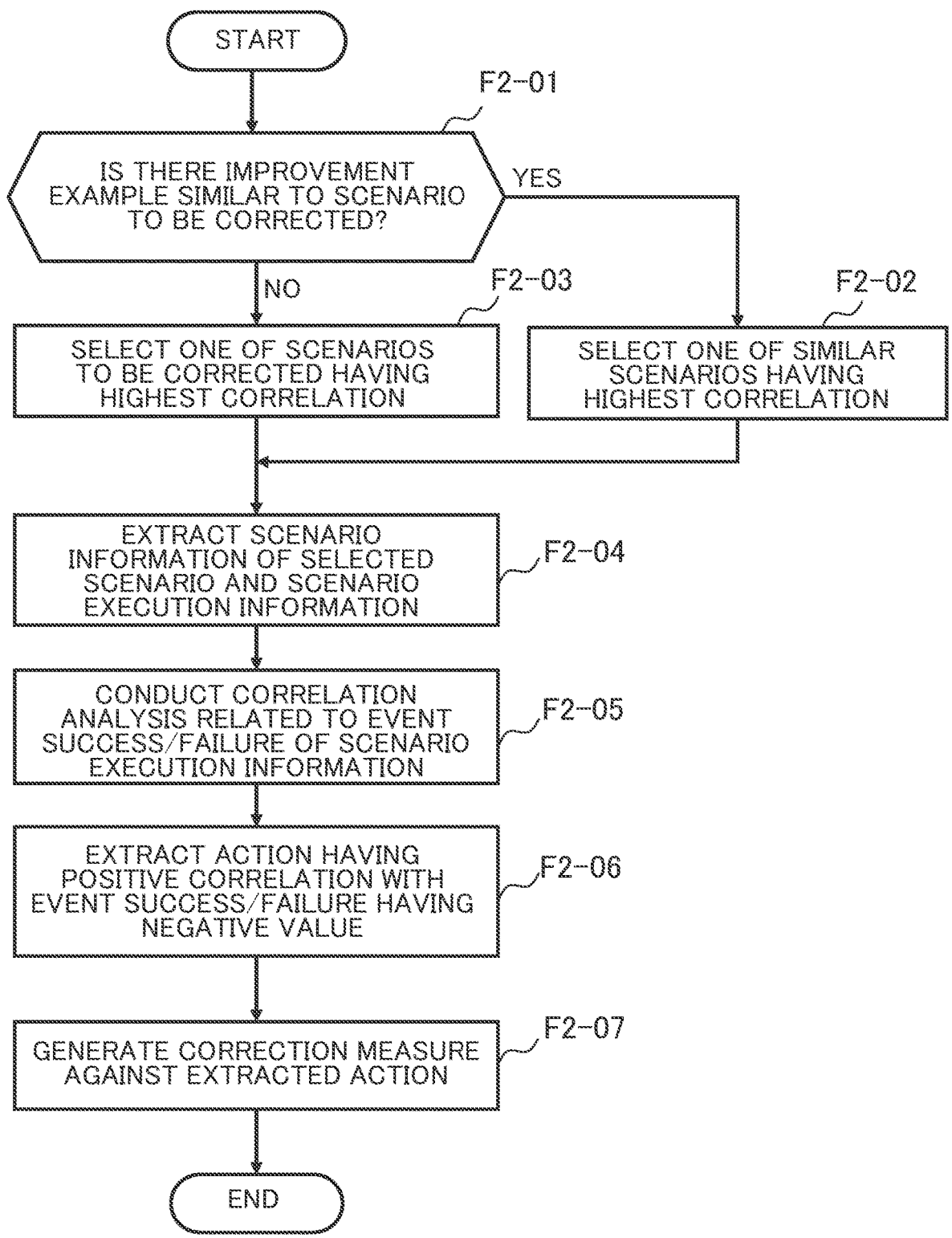
FIG. 20 is a flowchart for showing a processing example of a first scenario correction.

FIG. 20 is a flowchart for showing a processing example of the first scenario correction. FIG. 20 shows details of the process of Step F1-03 in FIG. 19, and shows a detailed processing flow of a measure of the first scenario correction against a scenario whose correlation with the business index value is equal to or larger than the scenario relevancy threshold value 2 and smaller than the scenario relevancy threshold value 1 in the business analysis process. There are a desirable result and an undesirable result for scenarios for realizing services, and these are managed as the event success/failure of the scenario execution information DB 367.

The desirable result means that a scenario was smoothly processed from beginning to end and information requested by a customer could be obtained, or a phenomenon that services that a service provider wished to provide were used or a product was purchased occurred. The undesirable result is not necessarily the inverse phenomenon of the desirable result. For example, a case in which a visitor could not smoothly communicate with the robot and the scenario finished in the middle before the end is conceivable. Communications between the robot 2 and a human are partially different from those between humans, and the robot fails in voice recognition without pausing a moment in some cases. There are some possible means to solve a phenomenon leading to such an undesirable result. However, the easiest method to realize is to realize natural conversation timing suitable for the robot by lengthening the duration of motion in the execution of the scenario or lengthening waiting time until the next motion.

In the determination process of the first scenario correction measure shown in FIG. 20, the business analysis server 5 first searches the business improvement history DB 563 for an improvement example similar to the scenario to be corrected whose correlation with the business index value is equal to or larger than a second threshold value and smaller than a first threshold value (Step F2-01). The similar improvement example means a business improvement history matching the scenario to be corrected in the business index value identifier, the business identifier, the location identifier, and the scenario correction content among those managed in the business improvement history DB 563. The business index value identifier, the business identifier, and the location identifier are managed in the business improvement history DB 563.

The business index value identifier can be obtained by searching the scenario attribute information DB 569 using the scenario identifier. The business identifier can be obtained by searching the scenario information DB 364 using the scenario identifier. In addition, the location identifier can be obtained in such a manner that the X coordinate and the Y coordinate of the robot are extracted by searching the robot information DB 363 using the robot identifier of the scenario execution information DB 367 and the base information DB 362 is searched using the extracted X coordinate and Y coordinate of the robot.

In the case where there is a past improvement example similar to the scenario to be corrected (Step F2-01: YES), the business analysis server 5 selects a scenario, as a correction target, having the highest correlation with the business index value among those to be corrected similar to the past improvement example (Step F2-02). In the case where there is no past improvement example similar to the scenario to be corrected (Step F2-01: NO), the business analysis server 5 selects a scenario having the highest correlation with the business index value among those to be corrected (Step F2-03). As described above, faster and accurate improvement of the business index value can be expected by referring to the past improvement case.

After a scenario is selected as a correction target scenario in Step F2-02 or F2-03, the business analysis server 5 extracts the scenario information corresponding to the correction target scenario and the scenario execution information corresponding to the correction target scenario from the scenario information DB 364 and the scenario execution information DB 367, respectively (Step F2-04). Then, the business analysis server 5 conducts a correlation analysis using the event success/failure of the scenario execution information extracted from the scenario execution information DB 367 as an index value (Step F2-05). Then, the business analysis server 5 extracts an action having a positive correlation with respect to the event success/failure having a negative value, namely, the undesirable result as an analysis result of Step S2-05 (Step F2-06). Namely, the business analysis server 5 makes a correction so as to suppress the negative influence degree of the extracted action in Step F2-06 so that the correction measure (correction scenario) of the scenario is generated (Step F2-07).

As a correction to suppress the negative influence degree of the action, for example, a correction measure such as increasing the execution speed of the action or lengthening the waiting time of the next action is conceivable. In communications with the robot, the conversation timing deviates or it is difficult to determine appropriate timing to speak to the robot. Due to the reasons, a phenomenon that a conversation is not smoothly carried on is conceivable. Thus, the conversation timing is adjusted by, for example, making a correction to set longer the waiting time before starting a conversation or, on the contrary, to increase the operation speed of motion before a conversation. Accordingly, it is possible to expect an effect that a conversation between a human and a robot can be naturally carried on as similar to a conversation between humans. The business analysis server 5 executes the correction in Step F2-07, and then verifies the improvement effect of the business index value with the corrected scenario.

(Process of Second Scenario Correction)

Figure 21:
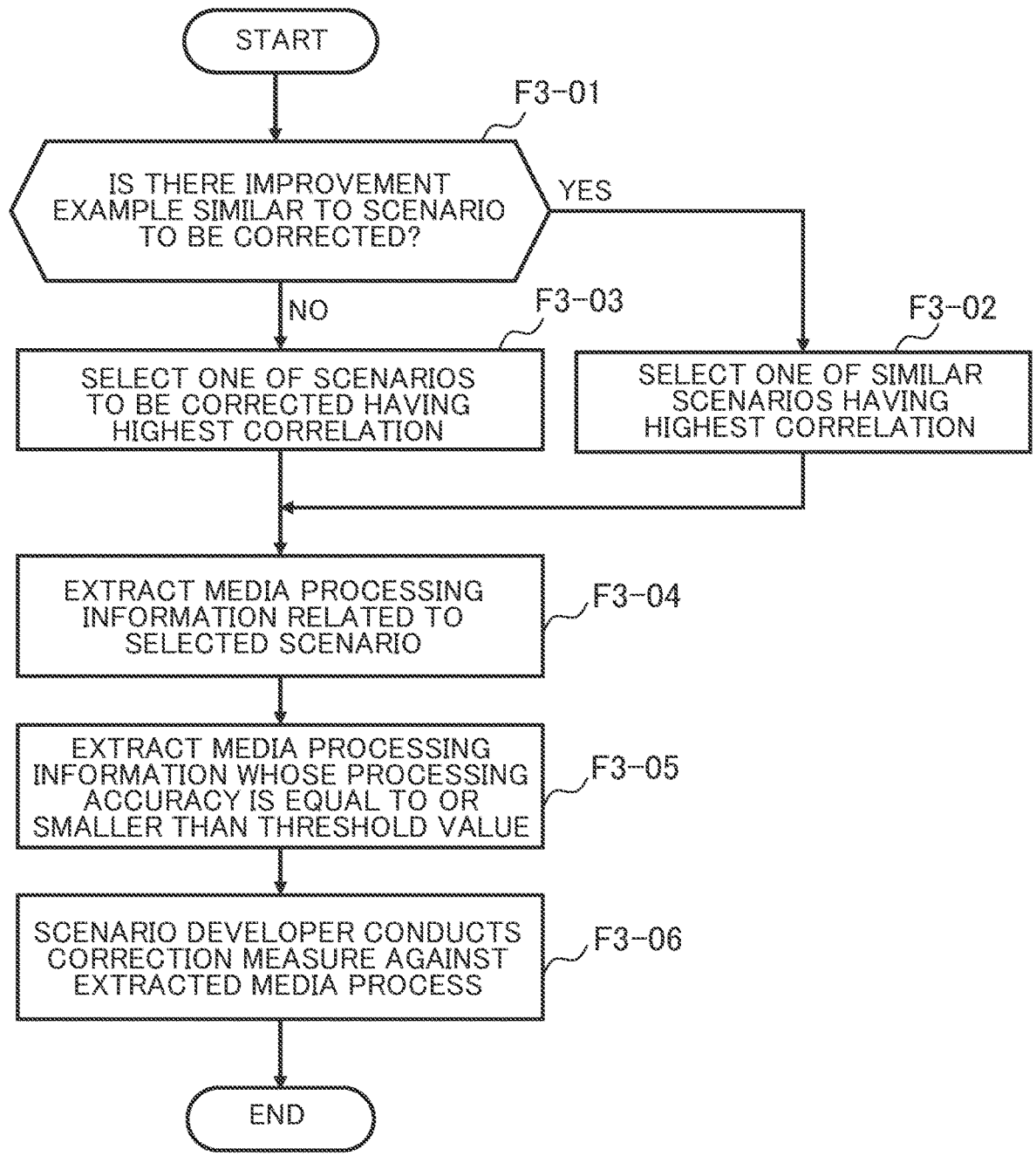
FIG. 21 is a flowchart for showing a processing example of a second scenario correction.

FIG. 21 is a flowchart for showing a processing example of the second scenario correction. FIG. 21 shows details of the process of Step F1-05 in FIG. 19, and shows a detailed processing flow of a measure of the second scenario correction against a scenario whose correlation with the business index value is equal to or larger than the scenario relevancy threshold value 3 and smaller than the scenario relevancy threshold value 2 in the business analysis process. For the scenario whose correlation with the business index value is not so high as being smaller than the scenario relevancy threshold value 2, a relatively minor correction such as a correction of motion or speech timing is not enough, and it is conceivable that drastic measures need to be taken.

For example, in the case where the robot 2 is asked an unexpected question in the scenario execution, the robot 2 cannot adequately answer the question, and thus it is conceivable that the user finishes the conversation with the robot 2 in the middle and leaves. The reason that the robot 2 cannot adequately answer the question is that the robot 2 does not have an answer to the question. Such a phenomenon appears as the low processing accuracy of the media processing information managed in the media processing information DB 867 managed by the media processing server 8.

An objective of the second scenario correction measure is to increase the success rate of a scenario by implementing a correspondence function for the media processing information that is low in processing accuracy. The processes of Steps F3-01, F3-02, and F3-03 in the determination process of the first scenario correction measure shown in FIG. 21 are the same as those of Steps F2-01, F2-02, and F2-03 shown in FIG. 20, respectively.

A scenario to be corrected is selected in Step F3-02 or F3-03, and then the business analysis server 5 extracts media processing information corresponding to the scenario to be corrected from the media processing information DB 369 (Step F3-04). Next, the business analysis server 5 further extracts media processing information whose processing accuracy is equal to or smaller than a predetermined threshold value from the media processing information extracted in Step F3-04 (Step F3-05). At this time, the business analysis server 5 presents a scenario corresponding to the media processing information extracted in Step F3-05 by, for example, being displayed on the display device 55a. Accordingly, a scenario developer can easily recognize the scenario against which drastic measures need to be taken among the scenarios to be corrected selected in Step F3-02 or F3-03.

It is conceivable that a scenario is not normally operated with the media process that is low in processing accuracy due to a reason that learning data for processing media is lacking or that the scenario cannot deal with an expected question, and thus a correction measure is taken against the extracted media process (Step F3-06). It is assumed that a scenario developer manually corrects a scenario in the correction measure against the media process. For example, addition of learning data, a new question sentence, and an answer to the new question sentence is conceivable.

For example, in a system operation in a retail store or the like, information related to a product handled in the retail store is generally provided. However, it is conceivable that humans ask a question about a different product highly related to the product in addition to the product sold in the retail store. In the case where the different product is not handled in the retail store, information related to the product, for example, information of a shop that handles the product or information of the location of the shop is added, so that the following services can be smoothly operated. When the execution of the correction measure against the media process is completed, the business analysis server 5 conducts services over the trial period with the corrected scenario, and records and verifies changes of the business index value.

(Business Analysis Process)

Figure 22:
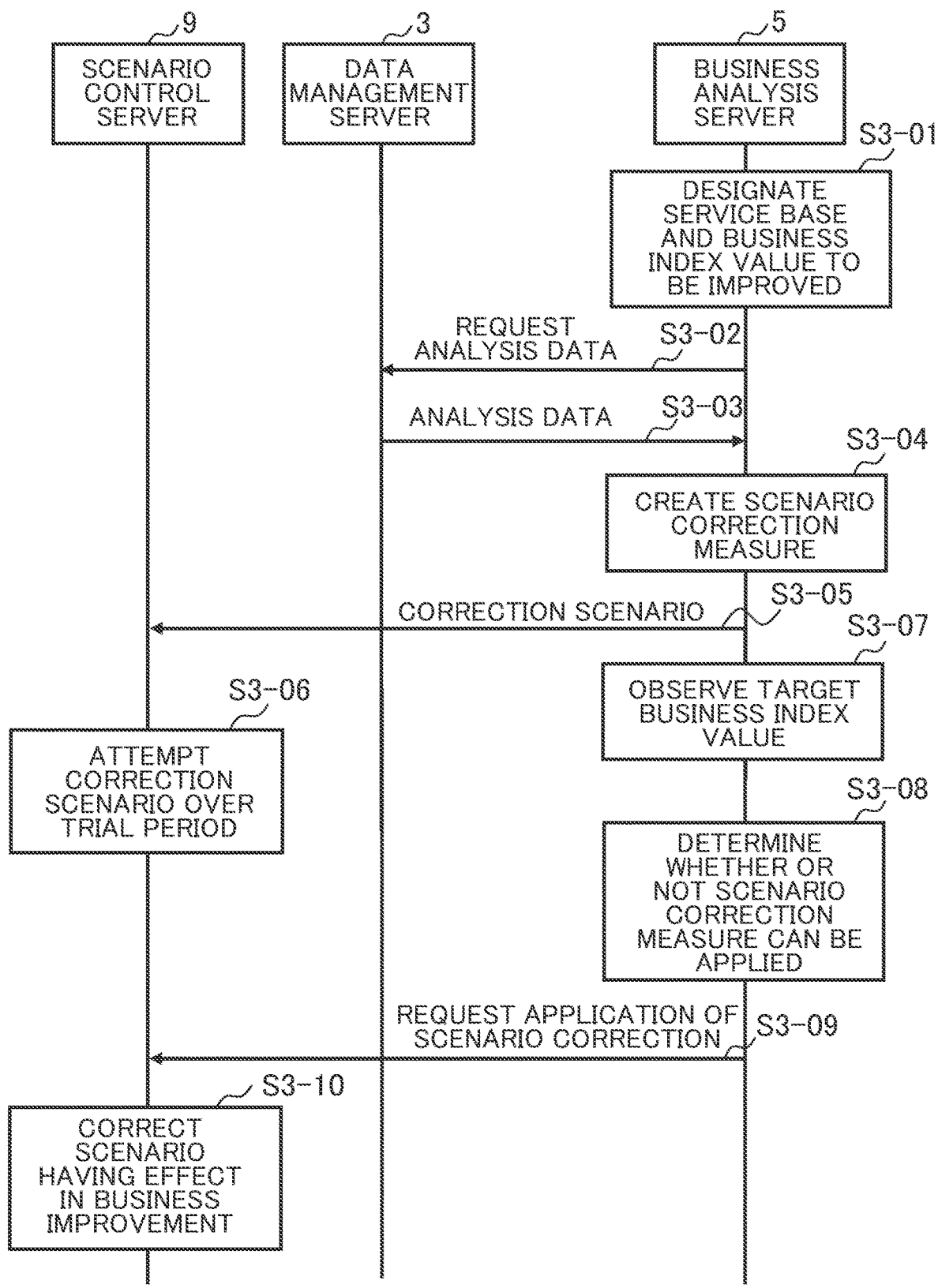
FIG. 22 is a sequence diagram for showing an example of the business analysis process.

Next, a series of flows of the above-described business analysis process will be described. FIG. 22 is a sequence diagram for showing an example of the business analysis process. In the business analysis process, the business analysis server 5 first accepts a selection of the service base 101 in which the business is to be improved and the business index value to be improved via a GUI (see FIG. 23), and accepts an input of a target value of the business index value to be improved (Step S3-01). Next, the business analysis server 5 obtains data necessary for the business analysis by requesting the data management server 3 (Steps S3-02 and S3-03).

The data necessary for the business analysis indicates data having the base identifier corresponding to the service base 101 where the business is to be improved selected in Step S3-01 among the pieces of information managed in each of the base information DB 362, the robot information DB 363, the scenario information DB 364, the service device information DB 365, the scenario execution information DB 367, and the media processing information DB. The business analysis server 5 creates a scenario correction measure in accordance with the processing flows shown in the flowcharts of FIG. 19, FIG. 20, and FIG. 21 (Step S3-04), and transmits a scenario corrected according to the scenario correction measure to the scenario control server 9 (Step S3-09).

The scenario control server 9 provides services with the corrected scenario over a predetermined trial period (Step S3-06). The business analysis server 5 monitors and records the business index value to be improved during an attempt of the corrected scenario over the trial period of Step S3-06 (Step S3-07). The business analysis server 5 determines whether or not the scenario correction measure can be applied in accordance with the increase/decrease range of the business index value monitored and recorded in Step S3-07 (Step S3-08). In the case where the increase/decrease range of the business index value of the scenario monitored and recorded in Step S3-07 corresponds to a scenario correction, the business analysis server 5 transmits a scenario correction application request to the scenario control server 9 (Step S3-09), and perpetuates the correction measure conducted for the scenario for the business improvement (Step S3-10). By determining whether or not the scenario correction measure can be applied after conducting the corrected scenario over the trial period and monitoring the improvement effect of the business index value to be improved, the correction measure having the improvement effect of the business index value can be appropriately perpetuated.

(GUI Used in Scenario Correction)

Figure 23:
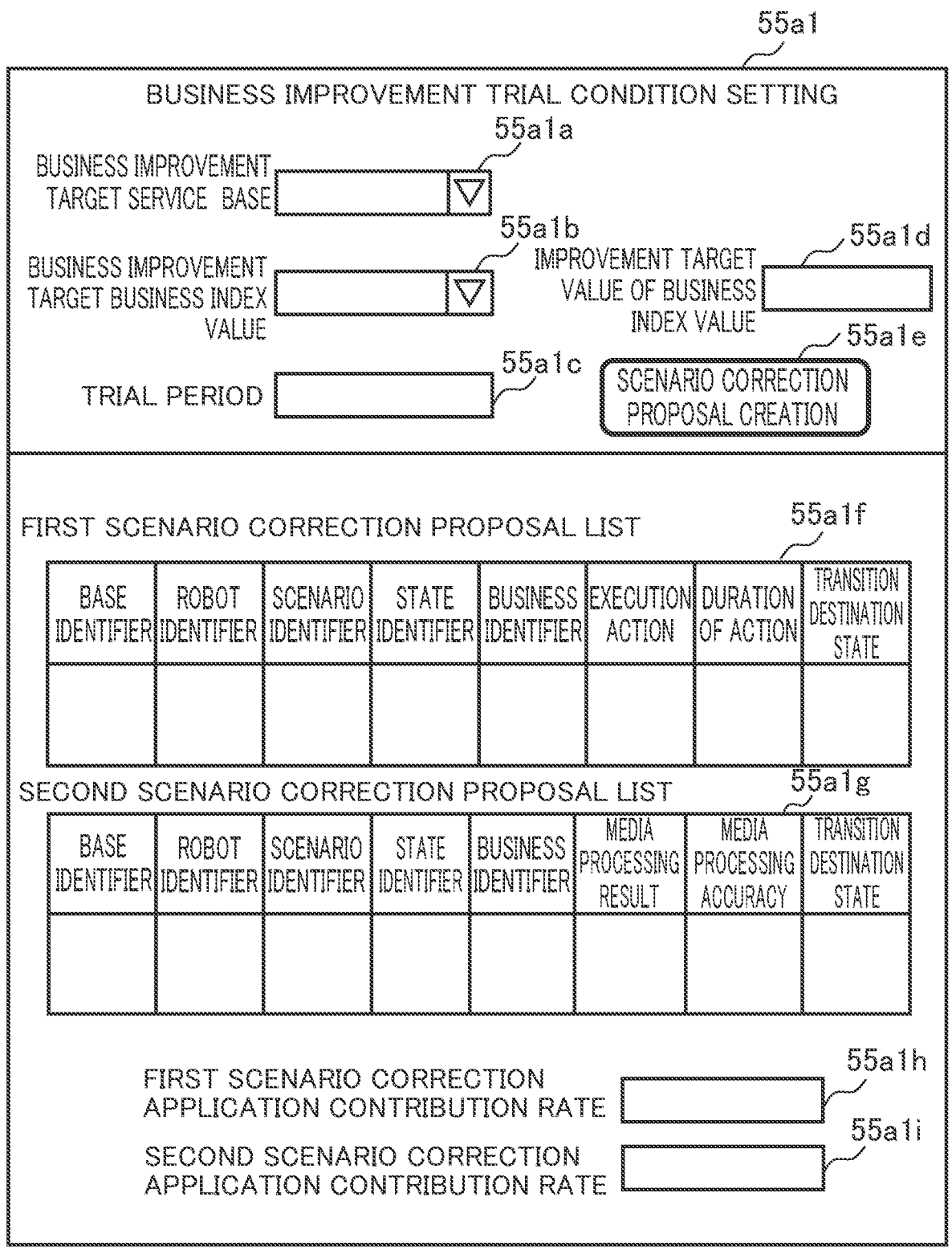
FIG. 23 is a diagram for showing a configuration example of a GUI used in a scenario correction.

FIG. 23 is a diagram for showing a configuration example of a GUI used in the scenario correction. FIG. 23 shows an image of a GUI 55a1 operated by a business analyst and displayed on the display device 55a in order to set trial conditions of the business improvement when conducting the business improvement. When conducting the business improvement, the business analyst selects and inputs the service base 101 where the business is to be improved using a pull-down menu 55a1a and the business index value for the business improvement using a pull-down menu 55a1b.

Further, the business analyst inputs, using an input field 55a1c, an improvement target value of the business index value selected and input using the pull-down menu 55a1b. The trial period corresponds to the scenario correction trial period managed in the business index value DB 565, and a period in accordance with the business index value selected and input using the pull-down menu 55a1b is automatically set. However, the business analyst may manually change if needed.

When the business analyst presses a scenario correction proposal creation button 55a1e after inputting necessary information, a correction proposal of the target scenario generated in the process of the first scenario correction shown in FIG. 20 and including a correction of the action duration is displayed on a first scenario correction proposal list 55a1f. Information of the target scenario is displayed on a second scenario correction proposal list 55a1g, but a correction proposal of the scenario is not automatically generated. Thus, it is necessary for the business analyst to manually reflect the correction proposal of the target scenario if needed.

In addition, when the correction proposal of the target scenario is displayed on the first scenario correction proposal list 55a1f or the second scenario correction proposal list 55a1g, the contribution rate of each correction by the first scenario correction proposal list 55a1f and the second scenario correction proposal list 55a1g for the improvement of the business index value for the business improvement selected and input using the pull-down menu 55a1b is displayed in a first scenario correction application contribution rate display section 55a1h and a second scenario correction application contribution rate display section 55a1i, respectively.

It should be noted that the first scenario correction application contribution rate displayed in the first scenario correction application contribution rate display section 55a1h and the second scenario correction application contribution rate displayed in the second scenario correction application contribution rate display section 55a1i may be, for example, the ratios of increased and decreased values obtained by calculating each of the increased and decreased values of the business index value in the case where each of the first scenario correction and the second scenario correction is independently applied.

The above-described embodiment can be applied to the robot system in which the various service devices and the robot existing in the service base cooperate with each other. A scenario that achieves improvement of the business index value selected by a business analyst is extracted, and an effect is verified by proposing a correction proposal of the scenario that contributed to the improvement of the business index value through an attempt, so that the efficiency improvement of businesses such as a reception, guidance, a sales promotion, and the like in the case where the robot system is introduced can be promoted. In addition, an effect obtained by introducing the robot system can be visualized, and the introduction promotion of the robot system can be realized.

(Modified Example of Embodiment)

Figure 24:
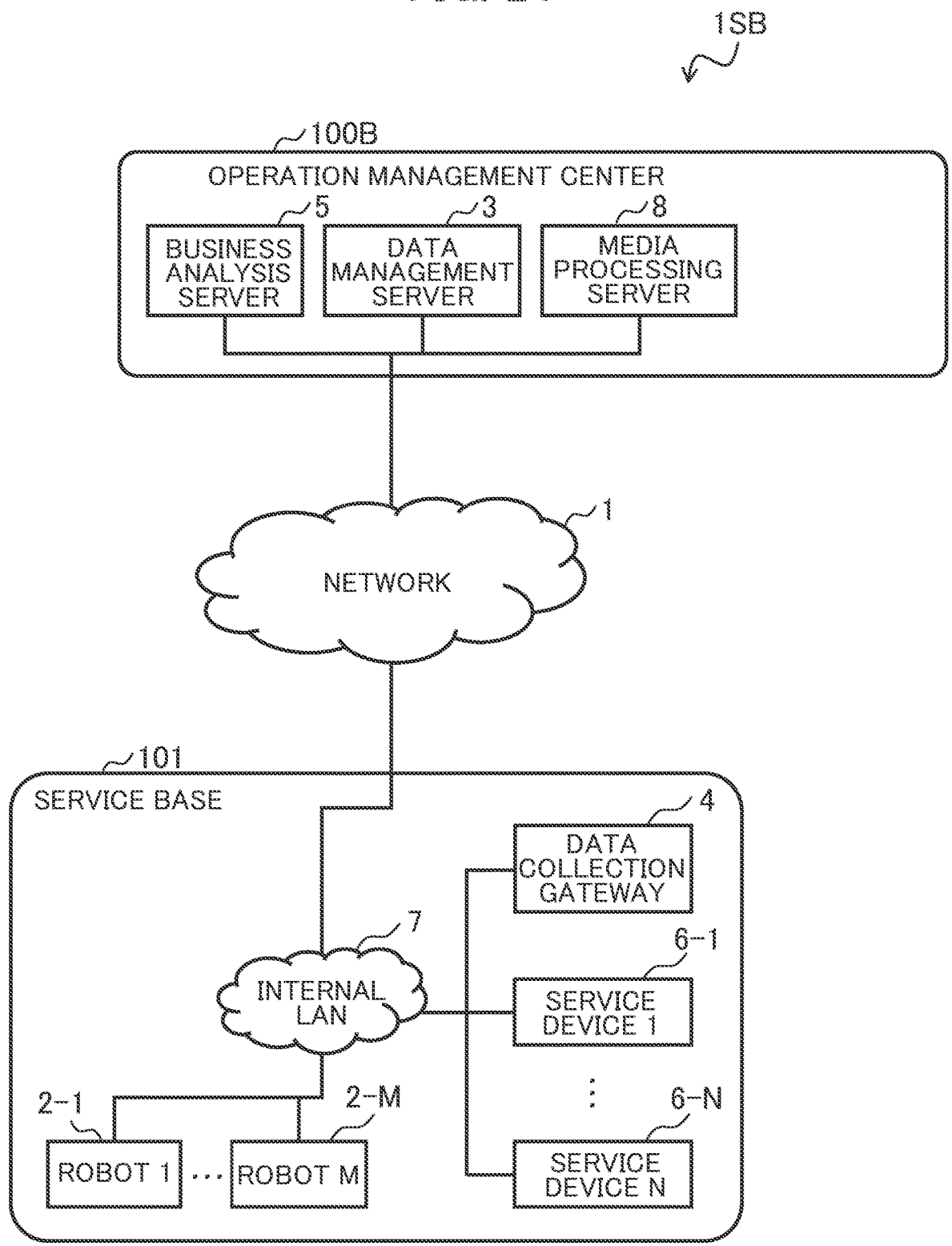
FIG. 24 is a block diagram for showing a modified example of a configuration of the data analysis system for mobile devices.
Figure 25:
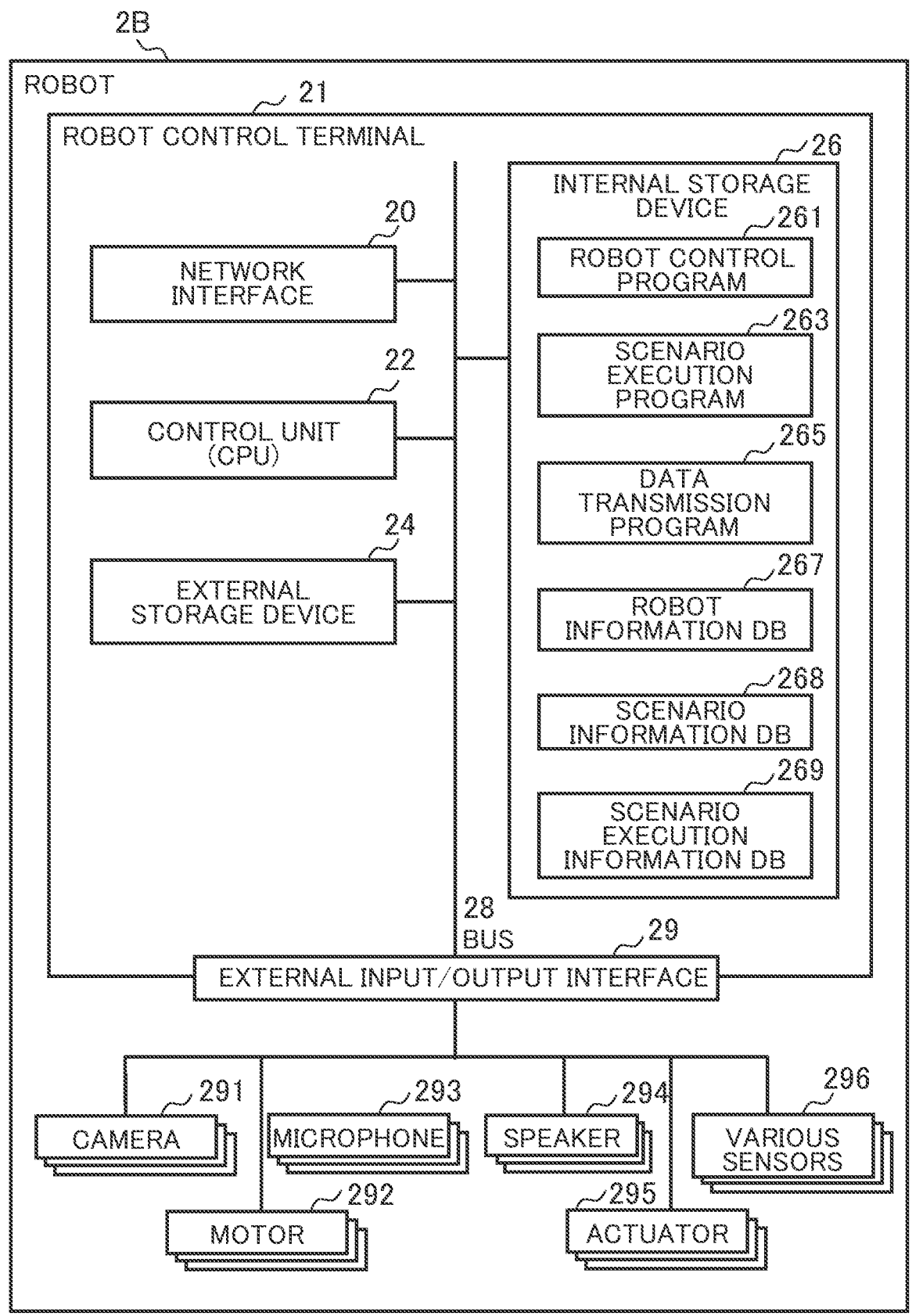
FIG. 25 is a block diagram for showing a modified example of a configuration of the robot.

FIG. 24 is a block diagram for showing a modified example of the configuration of the data analysis system for mobile devices. FIG. 25 is a block diagram for showing a modified example of the configuration of the robot. FIG. 26 is a diagram for showing a modified example of the structure of data managed by the robot.

In the system configuration and the device configuration of the embodiment, the scenario control is supposed to be performed outside the robot 2. However, the present invention can employ a configuration in which the function of the scenario control server 9 is included in the robot 2. FIG. 24 is a system configuration diagram of a data analysis system for mobile devices 1SB of the modified example in which the scenario control function is implemented in the robot 2. The system configuration diagram of FIG. 24 is different from that of FIG. 1 in that the scenario control server 9 is not installed and omitted in an operation management center 100B.

As shown in FIG. 25, in the configuration of a robot 2B of a second modified example, a scenario information DB 268 and a scenario execution information DB 269 are added as databases managed by the robot 2B. The structures of the robot information DB 267, the scenario information DB 268, and the scenario execution information DB 269 managed in the internal storage device 26 by the robot 2B are shown in FIG. 26, and have already explained in FIG. 3, FIG. 9, and FIG. 13. Thus, the detailed explanation thereof will be omitted.

(Configuration of Computer Realizing Each Server)

Figure 27:
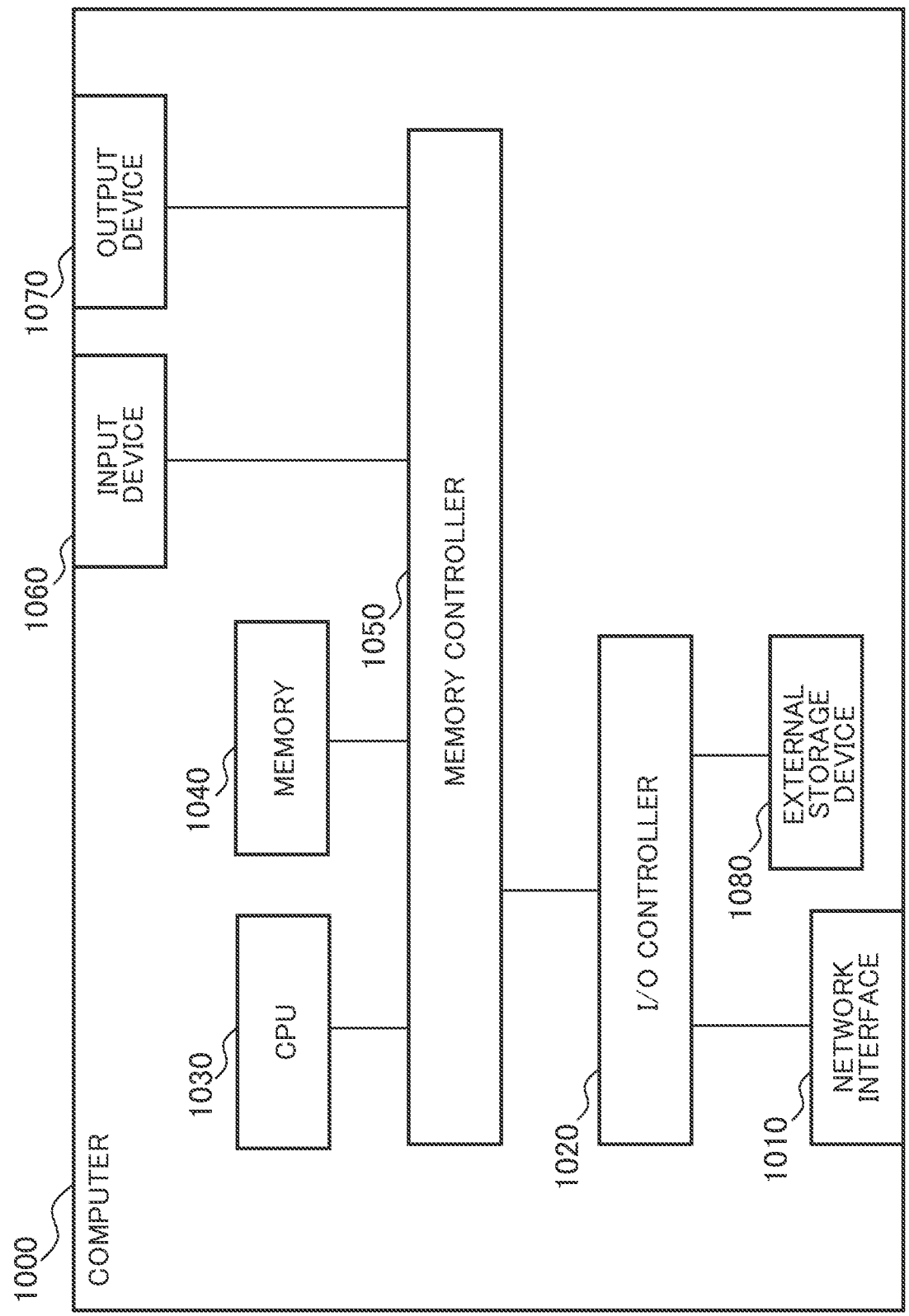
FIG. 27 is a diagram for showing a hardware configuration example of a computer for realizing each server such as a business analysis server, a scenario control server, a media processing server, and a data management server.

FIG. 27 is a diagram for showing a hardware configuration example of a computer for realizing each server such as a business analysis server, a scenario control server, a media processing server, and a data management server. In a computer 1000 that realizes a business analysis server 5, a scenario control server 9, a media processing server 8, and a data management server 3, a CPU (Central Processing Unit) 530, a memory 1040 such as a RAM (Random Access Memory), an input device 1060 (for example, a keyboard, a mouse, a touch panel, and the like), and an output device 1070 (for example, a video graphic card connected to an external display monitor) are mutually connected to each other through a memory controller 1050.

In the computer 1000, for example, a program for realizing the business analysis server 5 is read from an external storage device 1080 such as an SSD (Solid State Drive) or an HDD (Hard Disk Drive) via an I/O (Input/Output) controller 1020, and is executed by cooperation of the CPU 1030 and memory 1040, so that the business analysis server 5 can be realized. Alternatively, a program for realizing the business analysis server 5 may be obtained from an external computer through communications via a network interface 1010. Methods of realizing the scenario control server 9, the media processing server 8, and the data management server 3 using the computer 1000 are the same as that of the business analysis server 5.

Although the present disclosure has been described with reference to example embodiments, those skilled in the art will recognize that various changes and modifications may be made in form and detail without departing from the spirit and scope of the claimed subject matter.

For example, the embodiment has been described in detail to easily understand the present invention, and is not necessarily limited to one including all the configurations described above. In addition, unless inconsistent with the present invention, a part of a configuration of an embodiment can be replaced by a configuration of another embodiment, or a configuration of an embodiment can be added to a configuration of another embodiment. Further, addition, deletion, replacement, integration, and division are possible in a part of a configuration of each embodiment. Further, each process shown in the embodiment may be appropriately dispersed or integrated on the basis of processing efficiency or implementation efficiency.

What is claimed is:

1. A server, the server comprising:
   a network interface connected to a robot via a network;
   a control unit coupled to the network interface; and
   a storage unit including a business index value database that manages a business index value indicating an effect of the business and a business index value history database that manages a change in the business index value as time-series data,
   wherein the control unit receives scenario execution information representing an execution status of the scenario when a business index value to be improved is designated among the business index values,
   wherein the control unit analyzes a correlation between the business index value to be improved and the scenario by referring to the business index value history database and the scenario execution information,
   wherein the control unit extracts a target scenario whose correlation value with the business index value to be improved satisfies predetermined conditions from the scenario execution information,
   wherein the control unit generates a correction scenario for correcting the target scenario,
   wherein for the target scenario whose correlation value with the business index value to be improved is equal to or larger than a first scenario relevancy threshold value, the control unit does not generate the correction scenario for correcting the target scenario,
   wherein for the target scenario whose correlation value with the business index value to be improved is smaller than the first scenario relevancy threshold value and equal to or larger than a second scenario relevancy threshold value, the control unit generates the correction scenario for correcting the target scenario that corrects a duration of an action regulating the operation of a robot included in scenario information representing a state of a scenario controlling the operation of the robot,
   wherein the robot executes a time-series of actions according to the target scenario having been corrected by the generated correction scenario, the time-series of actions including the action having the corrected duration,
   wherein each of the time-series of actions executed by the robot include one of speaking, recognizing a voice of a human, a gesture indicating the robot understood the content of a question asked by the human, and waving, and
   wherein the duration is a period of time required for each of the time-series of actions executed by the robot.

2. The server according to claim 1,
   wherein the storage unit further includes a business improvement history database that manages an improvement history of the business index value including scenario correction content,
   wherein for the target scenario whose correlation value with the business index value to be improved is smaller than the first scenario relevancy threshold value and equal to or larger than the second scenario relevancy threshold value, the control unit selects a scenario having the largest correlation value with the business index value to be improved among those corresponding to the scenario correction content included in the improvement history in the case where the improvement history similar to the target scenario is present, selects a scenario having the largest correlation value with the business index value to be improved among the target scenarios in the case where the improvement history similar to the target scenario is not present, conducts a correlation analysis for the scenario information and the scenario execution information corresponding to the selected scenario using an event success and/or event failure of the scenario execution information as an index value, extracts an action having a positive correlation with respect to the event success and/or event failure having a negative value from the scenario information, and generates the correction scenario for suppressing the negative influence degree of the action.

3. The business analysis server according to claim 1,
   wherein among the target scenarios whose correlation values with the business index value to be improved are smaller than the second scenario relevancy threshold value and equal to or larger than a third scenario relevancy threshold value, the control unit presents a scenario whose accuracy of a media processing result included in media processing information representing the media processing result of the robot is equal to or smaller than a predetermined threshold value as a correction candidate scenario.

4. The business analysis server according to claim 3,
   wherein the storage unit further includes a business improvement history database that manages an improvement history of the business index value including scenario correction content,
   wherein the control unit selects a scenario having the largest correlation value with the business index value to be improved among those corresponding to the scenario correction content included in the improvement history in the case where the improvement history similar to the target scenario is present,
   wherein the control unit selects a scenario having the largest correlation value with the business index value to be improved among the target scenarios in the case where the improvement history similar to the target scenario is not present, and wherein the media processing information is extracted from a media processing information database on the basis of a correspondence relation with the selected scenario.

5. The server according to claim 3,
wherein the control unit excludes the target scenario whose correlation value with the business index value to be improved is smaller than the third scenario relevancy threshold value from the scenarios for controlling the robot.

6. The server according to claim 3,
wherein the control unit determines presence or absence of improvement of the business index value by controlling the robot on the basis of the correction scenario over a scenario correction trial period corresponding to the business index value to be improved.

7. The server according to claim 6,
wherein the control unit determines presence or absence of improvement of the business index value by controlling the robot on the basis of one or both of a first correction scenario for correcting the target scenario whose correlation value with the business index value to be improved is smaller than the first scenario relevancy threshold value and equal to or larger than the second scenario relevancy threshold value and a second correction scenario for correcting the target scenario whose correlation value with the business index value to be improved is smaller than the second scenario relevancy threshold value and equal to or larger than the third scenario relevancy threshold value.

8. The server according to claim 7,
wherein the control unit reflects the correction scenario on the scenario for controlling the robot in the case where the improvement of the business index value is present.

9. A method executed by a server, the server comprising: a network interface coupled to a robot; a control unit coupled to the network interface; and a storage unit, the method comprising:
storing, in the storage unit, a a business index value database that manages a business index value indicating an effect of the business and a business index value history database that manages a change in the business index value as time-series data;
receiving by the control unit, scenario execution information representing an execution status of the scenario when a business index value to be improved is designated among the business index values;
analyzing, by the control unit, a correlation between the business index value to be improved and the scenario by referring to the business index value history database and the scenario execution information;
extracting, by the control unit, a target scenario whose correlation value with the business index value to be improved satisfies predetermined conditions from the scenario execution information; and
generating, by the control unit, a correction scenario for correcting the target scenario,
wherein for the target scenario whose correlation value with the business index value to be improved is equal to or larger than a first scenario relevancy threshold value, the control unit does not generate the correction scenario for correcting the target scenario,
wherein for the target scenario whose correlation value with the business index value to be improved is smaller than the first scenario relevancy threshold value and equal to or larger than a second scenario relevancy threshold value, the control unit generates the correction scenario for correcting the target scenario that corrects a duration of an action regulating the operation of a robot included in scenario information representing a state of a scenario controlling the operation of the robot,
wherein the robot executes a time-series of actions according to the target scenario having been corrected by the generated correction scenario, the time-series of actions including the action having the corrected duration,
wherein each of the time-series of actions executed by the robot include one of speaking, recognizing a voice of a human, a gesture indicating the robot understood the content of a question asked by the human, and waving, and
wherein the duration is a period of time required for each of the time-series of actions executed by the robot.

10. A non-transitory computer readable storage medium storing a program that is executable by a computer, the computer connected to a network interface that is connected to a robot via a network, the program causing the computer to executes steps comprising:
storing, in a storage unit, a business index value database that manages a business index value indicating an effect of the business and a business index value history database that manages a change in the business index value as time-series data;
receiving a control unit that receives scenario execution information representing an execution status of the scenario when a business index value to be improved is designated among the business index values;
analyzing a correlation between the business index value to be improved and the scenario by referring to the business index value history database and the scenario execution information;
extracting a target scenario whose correlation value with the business index value to be improved satisfies predetermined conditions from the scenario execution information, and
generating a correction scenario for correcting the target scenario,
wherein for the target scenario whose correlation value with the business index value to be improved is equal to or larger than a first scenario relevancy threshold value, the control unit does not generate the correction scenario for correcting the target scenario,
wherein for the target scenario whose correlation value with the business index value to be improved is smaller than the first scenario relevancy threshold value and equal to or larger than a second scenario relevancy threshold value, the control unit generates the correction scenario for correcting the target scenario that corrects a duration of an action regulating the operation of a robot included in scenario information representing a state of a scenario controlling the operation of the robot,
wherein the robot executes a time-series of actions according to the target scenario having been corrected by the generated correction scenario, the time-series of actions including the action having the corrected duration, wherein each of the time-series of actions executed by the robot include one of speaking, recognizing a voice of a human, a gesture indicating the robot understood the content of a question asked by the human, and waving, and wherein the duration is a period of time required for each of the time-series of actions executed by the robot.

\* \* \* \* \*